United States Patent
Geva et al.

(10) Patent No.: US 10,652,592 B2
(45) Date of Patent: May 12, 2020

(54) NAMED ENTITY DISAMBIGUATION FOR PROVIDING TV CONTENT ENRICHMENT

(71) Applicant: COMIGO LTD., Yarkona (IL)

(72) Inventors: Guy Geva, Kfar-Saba (IL); Menahem Lasser, Kohav-Yair (IL)

(73) Assignee: Comigo Ltd., Yarkona (IL)

( * ) Notice: Subject to any disclaimer, the term of this patent is extended or adjusted under 35 U.S.C. 154(b) by 100 days.

(21) Appl. No.: 15/935,000

(22) Filed: Mar. 25, 2018

(65) Prior Publication Data

US 2019/0007711 A1    Jan. 3, 2019

Related U.S. Application Data

(60) Provisional application No. 62/528,104, filed on Jul. 2, 2017, provisional application No. 62/530,905, filed on Jul. 11, 2017.

(51) Int. Cl.
H04N 21/233    (2011.01)
H04N 21/234    (2011.01)
(Continued)

(52) U.S. Cl.
CPC ..... *H04N 21/23424* (2013.01); *G06F 40/295* (2020.01); *G06Q 30/0241* (2013.01);
(Continued)

(58) Field of Classification Search
CPC ............. H04N 21/23424; H04N 21/84; H04N 21/23418; H04N 21/251; H04N 21/2668; H04N 21/233; H04N 21/4722; H04N 21/235; H04N 21/44008; H04N 21/4394; G06Q 30/0241; G10L 15/26; G06F 17/278
See application file for complete search history.

(56) References Cited

U.S. PATENT DOCUMENTS 5,012,522 A    4/1991 Lambert
5,715,325 A    2/1998 Bang et al.
(Continued)

FOREIGN PATENT DOCUMENTS

EP    3127339 A1    1/2017
GB    2452519 A    3/2009
(Continued)

OTHER PUBLICATIONS

Co-pending U.S. Appl. No. 15/935,000, filed Mar. 25, 2018.
(Continued)

*Primary Examiner* — Junior O Mendoza
(74) *Attorney, Agent, or Firm* — Marc Van Dyke; Momentum IP Group

(57) ABSTRACT

Methods and systems are disclosed for enriching a viewing experience of a user watching video content on a screen of a client terminal by increasing the relevance of additional media content proposed or provided to the user. Disambiguation of named entities detected in a video content item being played is performed by identifying and accessing an information source directly associated with the video content item, and/or by analyzing visual content of a segment of the video content item. Selecting, proposing and/or providing an additional media content item is based on the information source and/or on the analyzing.

20 Claims, 11 Drawing Sheets

(51) Int. Cl.
*G06Q 30/02* (2012.01)
*G10L 15/26* (2006.01)
*H04N 21/2668* (2011.01)
*H04N 21/25* (2011.01)
*G10L 15/18* (2013.01)
*H04N 21/84* (2011.01)
*G06F 40/295* (2020.01)
*H04N 21/4722* (2011.01)

(52) U.S. Cl.
CPC .......... *G10L 15/1815* (2013.01); *G10L 15/26* (2013.01); *H04N 21/233* (2013.01); *H04N 21/23418* (2013.01); *H04N 21/251* (2013.01); *H04N 21/2668* (2013.01); *H04N 21/84* (2013.01); *H04N 21/4722* (2013.01)

(56) References Cited

U.S. PATENT DOCUMENTS

| | | |
|---|---|---|
| 6,608,930 B1 | 8/2003 | Agnihotri et al. |
| 6,823,084 B2 | 11/2004 | Myers et al. |
| 7,031,553 B2 | 4/2006 | Myers et al. |
| 7,386,438 B1 * | 6/2008 | Franz .................... G06F 17/275 704/240 |
| 7,672,833 B2 | 3/2010 | Blume et al. |
| 8,320,674 B2 | 11/2012 | Guillou et al. |
| 8,700,604 B2 | 4/2014 | Roseman et al. |
| 8,713,604 B2 | 4/2014 | Newell |
| 9,137,580 B2 | 9/2015 | Scott et al. |
| 9,462,342 B2 | 10/2016 | Krishnamurthy |
| 9,542,395 B2 | 1/2017 | Agarwal et al. |
| 9,582,482 B1 | 2/2017 | Sharifi et al. |
| 10,225,625 B2 * | 3/2019 | Homyack .......... H04N 21/8405 |
| 2003/0217052 A1 | 11/2003 | Rubenczyk et al. |
| 2005/0049852 A1 | 3/2005 | Chao |
| 2005/0080613 A1 | 4/2005 | Colledge et al. |
| 2005/0216443 A1 | 9/2005 | Morton et al. |
| 2005/0251382 A1 | 11/2005 | Chang et al. |
| 2006/0010138 A1 | 1/2006 | Huerta et al. |
| 2006/0136196 A1 | 6/2006 | Brun et al. |
| 2006/0136208 A1 | 6/2006 | Chung |
| 2006/0136385 A1 | 6/2006 | Bobrow et al. |
| 2006/0149555 A1 | 7/2006 | Fabbrizio et al. |
| 2006/0247983 A1 | 11/2006 | Dalli |
| 2007/0016580 A1 | 1/2007 | Mann et al. |
| 2007/0067285 A1 | 3/2007 | Blume |
| 2007/0106493 A1 | 5/2007 | Sanfilippo et al. |
| 2007/0169148 A1 | 7/2007 | Oddo et al. |
| 2007/0214189 A1 | 9/2007 | Groble |
| 2007/0233656 A1 | 10/2007 | Bunescu et al. |
| 2008/0040352 A1 | 2/2008 | Ellis |
| 2008/0065621 A1 | 3/2008 | Ellis |
| 2008/0071519 A1 | 3/2008 | Brun et al. |
| 2008/0080743 A1 | 4/2008 | Schneiderman et al. |
| 2008/0082510 A1 * | 4/2008 | Wang .................... H04H 60/37 |
| 2008/0126076 A1 | 5/2008 | Ming et al. |
| 2008/0154871 A1 | 6/2008 | Leidner et al. |
| 2008/0208864 A1 | 8/2008 | Cucerzan et al. |
| 2008/0301112 A1 | 12/2008 | Wu |
| 2008/0319978 A1 | 12/2008 | Brun et al. |
| 2009/0019474 A1 | 1/2009 | Robotham |
| 2009/0144609 A1 | 6/2009 | Liang et al. |
| 2009/0157705 A1 | 6/2009 | Nomiyama |
| 2009/0164431 A1 | 6/2009 | Livkovic et al. |
| 2009/0192968 A1 | 7/2009 | Tunstall-Pedoe |
| 2009/0204596 A1 | 8/2009 | Brun et al. |
| 2009/0319257 A1 | 12/2009 | Blume et al. |
| 2010/0004925 A1 | 1/2010 | Ah-Pine et al. |
| 2010/0046842 A1 * | 2/2010 | Conwell ................ G06K 9/228 382/218 |
| 2010/0076972 A1 | 3/2010 | Baron et al. |
| 2010/0145678 A1 | 6/2010 | Csomai et al. |
| 2010/0145902 A1 | 6/2010 | Boyan et al. |
| 2010/0185689 A1 | 7/2010 | Hu et al. |
| 2010/0235313 A1 | 9/2010 | Rea et al. |
| 2010/0293195 A1 | 11/2010 | Houghton |
| 2011/0106807 A1 | 5/2011 | Srihari et al. |
| 2011/0123115 A1 | 5/2011 | Lee et al. |
| 2011/0125735 A1 | 5/2011 | Petrou |
| 2011/0225155 A1 | 9/2011 | Roulland et al. |
| 2011/0246076 A1 | 10/2011 | Su et al. |
| 2011/0246442 A1 | 10/2011 | Bartell |
| 2011/0258556 A1 * | 10/2011 | Kiciman ................ G06Q 10/10 715/751 |
| 2011/0282888 A1 | 11/2011 | Koperski et al. |
| 2012/0102045 A1 | 4/2012 | Cucerzan et al. |
| 2012/0117078 A1 | 5/2012 | Morton et al. |
| 2012/0203772 A1 | 8/2012 | Cucerzan et al. |
| 2012/0250950 A1 | 10/2012 | Papakipos et al. |
| 2012/0271624 A1 | 10/2012 | Chen et al. |
| 2012/0324350 A1 | 12/2012 | Rosenblum et al. |
| 2013/0080152 A1 | 3/2013 | Brun et al. |
| 2013/0166303 A1 | 6/2013 | Chang et al. |
| 2013/0173604 A1 | 7/2013 | Li et al. |
| 2013/0198268 A1 | 8/2013 | Hyman |
| 2013/0238312 A1 | 9/2013 | Waibel |
| 2013/0275438 A1 | 10/2013 | Ajmera et al. |
| 2013/0311467 A1 | 11/2013 | Galle et al. |
| 2013/0346421 A1 | 12/2013 | Wang et al. |
| 2014/0039879 A1 | 2/2014 | Berman |
| 2014/0046653 A1 | 2/2014 | Gopalakrishnan et al. |
| 2014/0074886 A1 | 3/2014 | Medelyan et al. |
| 2014/0101542 A1 | 4/2014 | Albrecht et al. |
| 2014/0136184 A1 | 5/2014 | Hatsek et al. |
| 2014/0142922 A1 | 5/2014 | Liang et al. |
| 2014/0195532 A1 | 7/2014 | Dheap et al. |
| 2014/0214820 A1 | 7/2014 | ODonnell |
| 2014/0282219 A1 | 9/2014 | Haddock |
| 2014/0297252 A1 | 10/2014 | Prasad et al. |
| 2014/0316768 A1 | 10/2014 | Khandekar |
| 2014/0337372 A1 | 11/2014 | Lee et al. |
| 2015/0081281 A1 | 3/2015 | Bustelo et al. |
| 2015/0095306 A1 | 4/2015 | Zivkovic et al. |
| 2015/0106157 A1 * | 4/2015 | Chang .................... G06F 17/27 705/7.29 |
| 2015/0161237 A1 | 6/2015 | Agarwal et al. |
| 2015/0179228 A1 * | 6/2015 | Oisel .................. H04N 21/23418 386/241 |
| 2015/0212697 A1 | 7/2015 | Nordstrom |
| 2015/0269139 A1 | 9/2015 | McAteer et al. |
| 2015/0286629 A1 | 10/2015 | Abdel-Reheem et al. |
| 2015/0296228 A1 * | 10/2015 | Chen .................... G06F 16/78 725/34 |
| 2015/0312633 A1 | 10/2015 | Masciarotte |
| 2015/0331850 A1 | 11/2015 | Ramish |
| 2015/0332049 A1 | 11/2015 | Chen et al. |
| 2015/0334446 A1 | 11/2015 | Krikorian et al. |
| 2016/0012020 A1 | 1/2016 | George et al. |
| 2016/0012021 A1 | 1/2016 | Rosenblum et al. |
| 2016/0012040 A1 | 1/2016 | Hamada |
| 2016/0048655 A1 | 2/2016 | Maitra et al. |
| 2016/0055845 A1 | 2/2016 | Ikawa et al. |
| 2016/0078245 A1 | 3/2016 | Amarendran et al. |
| 2016/0085740 A1 | 3/2016 | Ikawa et al. |
| 2016/0110350 A1 | 4/2016 | Waibel |
| 2016/0117360 A1 | 4/2016 | Kunc et al. |
| 2016/0124937 A1 | 5/2016 | Elhaddad |
| 2016/0188597 A1 | 6/2016 | Moore |
| 2016/0203130 A1 | 7/2016 | Roque et al. |
| 2016/0275148 A1 | 9/2016 | Jiang |
| 2016/0306789 A1 | 10/2016 | Cougias et al. |
| 2016/0306984 A1 | 10/2016 | Amarendran et al. |
| 2016/0335234 A1 | 11/2016 | Baker et al. |
| 2016/0337609 A1 | 11/2016 | Zhou |
| 2017/0011092 A1 | 1/2017 | Huddleston et al. |
| 2017/0026705 A1 | 1/2017 | Yeh et al. |
| 2017/0039272 A1 | 2/2017 | Roseman et al. |
| 2017/0041644 A1 | 2/2017 | Dalrymple et al. |
| 2017/0060835 A1 | 3/2017 | Radford et al. |
| 2017/0085947 A1 | 3/2017 | Garrison et al. |
| 2017/0124065 A1 | 5/2017 | Cougias et al. |
| 2017/0147557 A1 | 5/2017 | Ajmera et al. |
| 2017/0147635 A1 | 5/2017 | McAteer et al. |

(56) References Cited

U.S. PATENT DOCUMENTS

| | | |
|---|---|---|
| 2017/0147924 A1 | 5/2017 | Ajmera et al. |
| 2017/0153782 A1 | 6/2017 | Sharifi et al. |
| 2017/0161367 A1* | 6/2017 | Kemp .................. G06F 17/278 |
| 2017/0161796 A1* | 6/2017 | Clark .................. G06Q 30/0282 |
| 2017/0243244 A1 | 8/2017 | Trabelsi et al. |
| 2017/0251265 A1 | 8/2017 | Perez |

FOREIGN PATENT DOCUMENTS

| | | |
|---|---|---|
| WO | 2007063468 A1 | 6/2007 |
| WO | 2007078846 A1 | 7/2007 |
| WO | 2012051620 A1 | 4/2012 |
| WO | WO2013082142 A1 | 1/2017 |
| WO | 2017149447 A1 | 9/2017 |

OTHER PUBLICATIONS

Co-pending U.S. Appl. No. 16/053,106, filed Aug. 2, 2018.
Co-pending U.S. Appl. No. 16/120,972, filed Sep. 4, 2018.
Co-pending U.S. Appl. No. 16/149,175, filed Oct. 2, 2018.
Co-pending U.S. Appl. No. 16/223,149, filed Dec. 18, 2018.
Co-pending U.S. Appl. No. 16/228,821, filed Dec. 21, 2018.

* cited by examiner

S06 Providing one media content item of the one or more media content items, thereby causing displaying the one media content item on the screen of the client terminal

S06-I Causing displaying on the screen of the client terminal a proposal for displaying the one media content item

S06-II Receiving from the client terminal a request to display the one media content item, the request caused by an input provided by the user subsequent to the displaying of the proposal

S16 Providing one media content item of the one or more media content items, thereby causing displaying the one media content item on the screen of the client terminal

S16-I Causing displaying on the screen of the client terminal a proposal for displaying the one media content item

S16-II Receiving from the client terminal a request to display the one media content item, the request caused by an input provided by the user subsequent to the displaying of the proposal

S16         FIG. 7

NAMED ENTITY DISAMBIGUATION FOR PROVIDING TV CONTENT ENRICHMENT

CROSS-REFERENCE TO RELATED APPLICATIONS

This patent application claims the benefit of U.S. Provisional Patent Application No. 62/530,905 filed on Jul. 11, 2017, and U.S. Provisional Patent Application No. 62/528,104 filed on Jul. 2, 2017, both of which are incorporated herein by reference in their entirety.

FIELD OF THE INVENTION

The present invention relates to systems and methods for enriching a viewing experience of a user watching video content on a screen of a client terminal by increasing the relevance of additional media content proposed to the user. In particular, the present invention is suitable for improving the efficacy of disambiguation of named entities detected in the watched video content, the disambiguation carried out for selecting related content to be recommended or provided to the user.

BACKGROUND

Natural Language Processing (NLP) is a well-known technology field which deals with analysis and understanding of natural language texts by computers. Extensive research is already going on in this field for several decades and good progress had been achieved, even though there is still much to be improved until computers will get close to humans in understanding free and general-purpose texts.

A specific topic within the NLP field is Named Entity Recognition (NER). A named entity may be a real-world object, such as a person, a location, an organization, a product, etc., that can be denoted with a proper name. It can be abstract or have a physical existence. Examples of named entities include Barack Obama, New York City, Volkswagen Golf, and anything else that can be named. Named entities can simply be viewed as instances of classes of entities (e.g., New York City is an instance of a city). Many natural language sentences contain named entities, and understanding such sentence requires (i) identifying the existence of named entities, and (ii) for each term identified to be a named entity, finding what does that named entity refer to.

For example, in order to correctly understand the sentence "I am familiar with New Jersey" a computer must detect that the word "Jersey" is part of the named entity "New Jersey" (a state of the US) and does not refer to its stand-alone meaning of "knitted clothing". One may argue that the fact that in the above example Jersey starts with a capital letter makes the task trivial. However, it should be remembered that in many cases the text to analyze is received from a speech-to-text automatic converter, where no capital letters can be known. Additionally, not all languages capitalize first letters of names as English does. If the above sentence would be written in Hebrew, there would be no detectable difference between the two interpretations of "Jersey" Similarly, in a language such as German wherein all nouns are capitalized (and not just 'proper nouns' as in English), there would be no detectable difference between two interpretations of any given noun that has an everyday meaning in addition to its meaning as a named entity.

Much research has gone into solving the Named Entity Recognition task and reasonably good solutions exist. Typically, NER implementations make extensive use of a dictionary, an encyclopedia, a database or a knowledge base for identifying a term as a named entity and for extracting its meaning. Wikipedia is the most commonly used source that is used for that purpose, because of its large size and diversity of covered fields.

However, recognizing a term in a sentence to be a named entity does not always bring with it immediate understanding of what it refers to. Consider the sentence "I admire Washington". Prior art Named Entity Recognition systems should have no difficulty in identifying "Washington" to be a named entity, but will face difficulties when having to determine which entity the sentence refers to—(i) Washington D.C., (ii) Washington State, (iii) Washington Irving, (iv) George Washington, or (v) another person called Washington. The problem of distinguishing between multiple candidate interpretations of a given named entity is called Named Entity Disambiguation (NED).

As for the NER problem, much research was done for solving the NED problem. Several examples of such research papers are:
1. Gentile, A. L., Zhang, Z., Xia, L. and Iria, J., 2010, January. Semantic relatedness approach for named entity disambiguation. In Italian Research Conference on Digital Libraries (pp. 137-148). Springer, Berlin, Heidelberg.
2. Hoffart, J., Seufert, S., Nguyen, D. B., Theobald, M. and Weikum, G., 2012, October. KORE: keyphrase overlap relatedness for entity disambiguation. In Proceedings of the 21st ACM international conference on Information and knowledge management (pp. 545-554).
3. Hoffart, J., 2015. Discovering and disambiguating named entities in text. Ph.D. thesis.
4. Mann, G. S. and Yarowsky, D., 2003, May. Unsupervised personal name disambiguation. In Proceedings of the seventh conference on Natural language learning at HLT-NAACL 2003-Volume 4 (pp. 33-40). Association for Computational Linguistics.

All of the four above documents are incorporated herein by reference in their entirety.

The issue of identifying the existence of a NED problem is straightforward—for example, a NER implementation that uses Wikipedia for identifying named entities can easily detect the existence of multiple Wikipedia pages referring to the same name. (Wikipedia actually provides an explicit "disambiguation page" for every name having multiple pages matching it, with the disambiguation page pointing to the different candidates for the name). The really difficult issue is determining which of the multiple candidates matching the same name is the one referred to in the analyzed text.

Prior art NED implementations use a variety of approaches. The simplest ones take their decision by looking only at the competing Wikipedia entries, without referring to additional inputs. For example, some NED systems determine which of the potential Wikipedia pages is most "popular" and pick it to be the intended meaning. Popularity of a given Wikipedia page can be determined, for example, by counting how many other Wikipedia pages contain a link pointing to the given page. Thus, in such NED systems the candidate Wikipedia page having the highest number of incoming links from other Wikipedia pages will always be selected for a given named entity.

More advanced NED systems do not always select the same candidate for all occurrences of a given named entity, but use the context in which the named entity appears in the analyzed text to customize the selection for each specific occurrence. The context of an occurrence of a named entity is typically taken to be the full sentence in which it appears, the full paragraph in which it appears, the full chapter in which it appears, or even the full document in which it appears. The competing Wikipedia pages are analyzed against the context of the named entity, and the "relatedness" between each of the competing pages and the context text is evaluated. The page found to be the most "related" to the context text is picked to be the intended interpretation of the named entity in its current occurrence.

"Relatedness" between two blocks of text obviously does not have a clear-cut measurement scale. Consequently, many algorithms were proposed in the research literature for measuring relatedness.

Some relatedness measuring algorithms are based on counting words that appear in both blocks.

Other relatedness algorithms are based on counting links from other blocks of text into the blocks whose relatedness is evaluated, working under the assumption that a third block containing links pointing to the two blocks whose relatedness is evaluated is a proof of a relation between them.

Other relatedness algorithms allocate different weights to different words, with some words contributing more to the relatedness when appearing in both text blocks. For example, words that appear in headers or in links may be considered more "important" and should contribute more, or words that appear multiple times in one or two of the compared text blocks should contribute more than words that appear only once in each block.

Going back to the NED disambiguation issue, the currently most advanced disambiguation algorithms use a semantic approach that takes into account the fact that there is usually some inter-dependence between multiple named entities appearing in the same context. When an analyzed block of text contains multiple ambiguous named entities, each having multiple candidates to select from, it is reasonable to assume the correct selections for the multiple named entities depend on each other. This is in contrast to all previously described disambiguation algorithms that deal separately with each ambiguous named entity and pick the most reasonable candidate for it independently of the disambiguation selections made for the other ambiguous named entities.

Ignoring inter-relations between adjacent ambiguous named entities may result in a clearly incorrect interpretation of the analyzed sentence, even when each one of the named entities in question is assigned its most reasonable interpretation. For example, a text about a football game may say "The game between Amsterdam and Barcelona will take place in Madrid". Each of the three named entities ("Amsterdam", "Barcelona" and "Madrid") is ambiguous—it may refer either to a city or to a football club associated with a city. As the text is known to be about football, most NED algorithms disambiguating each ambiguous named entity on its own will resolve all three named entities as referring to a football club, which is indeed the most reasonable decision for each of the three ambiguities. The analyzed sentence would then be assumed to mean "The game between Ajax Amsterdam and FC Barcelona will take place in Real Madrid," which is obviously wrong. Thus, ignoring the semantic relations between named entities might lead to easy-to-detect failures in disambiguation.

The semantic approach to NED resolves the multiple ambiguities of the above example by searching for solutions in a single joint vector space combining the possible selections for all three named entities. In this case, a solution vector has a length of three and the solution space has 2×2×2=8 possible values from which we can choose.

In some implementations of the semantic approach, the disambiguation is achieved using semantic relatedness scores obtained with a graph-based model, taking into account the semantic relationships between all named entities. For each Wikipedia page that is a candidate for one of the ambiguous named entities, a list of features is extracted—words in the page title, most frequently used words in the page, words from categories of the page, words from outgoing links in the page, etc. We then construct a graph whose nodes are the candidates and the features, and the graph is used for determining semantic relatedness. The easier it is to move on the graph between two nodes, the more related are the nodes. The entities disambiguation algorithm is then based on a random walk of the graph. Applying such a semantic NED algorithm to the above example should produce the correct interpretation of "The game between Ajax Amsterdam and FC Barcelona will take place in Madrid."

Most NED implementations of the prior art rely for the disambiguation task only on (i) entries of the dictionary, encyclopedia, database or knowledge-base in use (e.g. Wikipedia) corresponding to potential candidates for the ambiguous named entities, and (ii) the textual context of the ambiguous named entities, usually making use only of the other named entities appearing within the textual context, but in some implementations also making use of words in the textual context which are not named entities. At least one prior art NED implementation (KORE, see the second research paper listed above) adds another source of information for disambiguating an ambiguous named entity— Internet websites that are associated with the candidates for the ambiguous named entity. For example, if the candidate entity is a person, then we may use his Internet home page. If the candidate entity is a company, then we may use its Internet website. If the candidate entity is performer, then we may use his/her fan website.

The use of NLP is widespread and the technology is applied in many fields of use. Consequently, the use of NER and NED is also widespread, as practically all NLP implementations require named entities recognition and disambiguation.

For example, NED is widely used in understanding search queries. When a user asks Google's search engine "What is the height of Washington?" the search engine needs to determine what is the meaning of the named entity "Washington" in the query—does the question refer to the height of a person or to the level above sea level of a city.

Another use of NED is in the field of content enrichment for video content consumers. When a user watches video content (a movie, a program, a news broadcast, etc.) on a viewing device (a TV set, a laptop, a smartphone, a tablet, etc.) it is common to present to him recommendations for related video content or other related information he may be interested in watching. The related content may be other movies or programs dealing with similar topics, biographical information about people mentioned or seen in the watched content, etc.

In many cases, the determination of what enriching content to recommend to the user is derived from the text heard in the sound track of the currently watched content. That text is obtained either from the subtitles of the movie or program that are provided in the stream of the watched content, or from an automatic conversion of the spoken text as it is heard in the sound track into written text using a speech-to-text conversion engine. In the case of subtitles in old movies, the text might be burned into the video, in which case extracting it from the video may require OCR technology. Regardless of the way by which the analyzed text is obtained, NED may be required. For example, if the text contains the named entity "Washington" there is a need to know if this refers to Washington State, Washington D.C. or George Washington. This determination will decide whether the TV system will recommend to the user the movie "Disclosure" (which was filmed in Washington State and takes place in Washington State), the TV series House of Cards (which takes place in Washington D.C.) or a documentary about George Washington.

The success rate of prior art NED implementations is not satisfactory. Even a success rate of 85% is considered to be very good (see the Hoffart Ph.D. thesis mentioned above). This is certainly not good enough for many real-world applications. A TV user may become highly frustrated when 15% of the recommendations he gets from his TV system turn out to be completely non-related to what he is currently watching.

Therefore, there is clearly a need for NED implementations that provide better success rates than what is achievable with prior art NED solutions.

The following United States published patent applications are incorporated herein by reference in their entirety: United States Patent Publication 20170161367, United States Patent Publication 20170153782, United States Patent Publication 20170147924, United States Patent Publication 20170147635, United States Patent Publication 20170147557, United States Patent Publication 20170124065, United States Patent Publication 20170060835, United States Patent Publication 20170039272, United States Patent Publication 20170011092, United States Patent Publication 20160335234, United States Patent Publication 20160306984, United States Patent Publication 20160306789, United States Patent Publication 20160275148, United States Patent Publication 20160203130, United States Patent Publication 20160188597, United States Patent Publication 20160124937, United States Patent Publication 20160117360, United States Patent Publication 20160110350, United States Patent Publication 20160085740, United States Patent Publication 20160078245, United States Patent Publication 20160055845, United States Patent Publication 20160048655, United States Patent Publication 20160012040, United States Patent Publication 20160012021, United States Patent Publication 20160012020, United States Patent Publication 20150332049, United States Patent Publication 20150331850, United States Patent Publication 20150286629, United States Patent Publication 20150269139, United States Patent Publication 20150161237, United States Patent Publication 20150095306, United States Patent Publication 20150081281, United States Patent Publication 20140337372, United States Patent Publication 20140316768, United States Patent Publication 20140297252, United States Patent Publication 20140282219, United States Patent Publication 20140214820, United States Patent Publication 20140195532, United States Patent Publication 20140142922, United States Patent Publication 20140136184, United States Patent Publication 20140101542, United States Patent Publication 20140074886, United States Patent Publication 20140046653, United States Patent Publication 20140039879, United States Patent Publication 20130346421, United States Patent Publication 20130311467, United States Patent Publication 20130275438, United States Patent Publication 20130238312, United States Patent Publication 20130198268, United States Patent Publication 20130173604, United States Patent Publication 20130166303, United States Patent Publication 20130080152, United States Patent Publication 20120324350, United States Patent Publication 20120271624, United States Patent Publication 20120203772, United States Patent Publication 20120117078, United States Patent Publication 20120102045, United States Patent Publication 20110258556, United States Patent Publication 20110246442, United States Patent Publication 20110246076, United States Patent Publication 20110225155, United States Patent Publication 20110125735, United States Patent Publication 20100235313, United States Patent Publication 20100185689, United States Patent Publication 20100145902, United States Patent Publication 20100145678, United States Patent Publication 20100076972, United States Patent Publication 20100004925, United States Patent Publication 20090319257, United States Patent Publication 20090204596, United States Patent Publication 20090192968, United States Patent Publication 20090164431, United States Patent Publication 20090157705, United States Patent Publication 20090144609, United States Patent Publication 20080319978, United States Patent Publication 20080301112, United States Patent Publication 20080208864, United States Patent Publication 20080154871, United States Patent Publication 20080126076, United States Patent Publication 20080071519, United States Patent Publication 20080065621, United States Patent Publication 20080040352, United States Patent Publication 20070233656, United States Patent Publication 20070214189, United States Patent Publication 20070106493, United States Patent Publication 20070067285, United States Patent Publication 20070016580, United States Patent Publication 20060247983, United States Patent Publication 20060149555, United States Patent Publication 20060136385, United States Patent Publication 20060136208, United States Patent Publication 20060136196, United States Patent Publication 20060010138, United States Patent Publication 20050251382, United States Patent Publication 20050216443, United States Patent Publication 20050080613, United States Patent Publication 20050049852, and United States Patent Publication 20030217052.

SUMMARY

The present invention relates to systems and methods for enriching a viewing experience of a user watching video content on a screen of a client terminal by increasing the relevance of additional media content proposed and/or provided to the user.

Embodiments of a method for enriching a viewing experience of a user watching video content on a screen of a client terminal by increasing the relevance of additional media content proposed to the user, are disclosed. The method comprises providing at least a portion of a video content item to the client terminal, thereby causing playing the at least a portion of the video content item on the screen of the client terminal. The method also comprises obtaining a segment of text that is spoken in a sound track of the video content item and identifying an occurrence of an ambiguous reference to a named entity in the segment of text, the ambiguous reference matching multiple candidate named entities. The method also comprises disambiguating the ambiguous reference, the disambiguating comprising identifying the video content item, identifying an information source, the information source being directly associated with the identified video content item; and assigning one candidate named entity of the multiple candidate named entities to the ambiguous reference, the assigning being based on information from the identified information source. The method also comprises selecting one or more media content items that are related to the video content item, the selecting being based on the assigned one candidate named entity, and providing one media content item of the one or more media content items, thereby causing displaying the one media content item on the screen of the client terminal.

In some embodiments, the disambiguating can additionally comprise analyzing visual content of a segment of video from the video content item, and the assigning can also be based on a result of the analyzing.

In some embodiments, the information from the identified information source can comprise at least one of graphics and video, the disambiguating can additionally comprise analyzing visual content of the at least one of graphics and video, and the information from the identified information source on which the assigning is based can include the analyzed visual content.

In some embodiments, the obtaining of the segment of text can include obtaining the segment of text from subtitles of the video content item. In some embodiments, the obtaining of the segment of text can include converting speech appearing in the sound track of the video content item into text using a speech-to-text conversion engine.

In some embodiments, the disambiguating of the named entity can be done in parallel to the playing of the at least a portion of the video content item.

In some embodiments, the providing of the one media content item can include causing the displaying on the screen of the client terminal of a proposal for displaying the one media content item, and receiving from the client terminal a request to display the one media content item. The request can be caused by an input provided by the user subsequent to the displaying of the proposal.

The displaying of the one media content item can be done in parallel to the playing of the at least a portion of the video content item. The displaying of the one media content item can be done subsequent to the playing of the at least a portion of the video content item. The displaying of the one media content item can be done while the playing of the at least a portion of the video content item is paused.

In some embodiments, the information source directly associated with the identified video content item can be a synopsis of the identified video content item. The synopsis can be obtained from an electronic program guide (EPG). The synopsis can be obtained from a video-on-demand (VOD) library. In some embodiments, the information source directly associated with the identified video content item can be an advertisement for the identified video content item. In some embodiments, the information source directly associated with the identified video content item can be a review of the identified video content item. In some embodiments, the information source directly associated with the identified video content item can be an entry in a source that is one of a group consisting of a database, a knowledge base, a dictionary and an encyclopedia, the entry corresponding to the identified video content item. The source that is one of the group can be one of the IMDb database and the Wikipedia encyclopedia. In some embodiments, the information source directly associated with the identified video content item can be an account in a social network, the account being dedicated to the identified video content item.

In some embodiments, the client terminal can include one of a smart TV, a Set-Top Box and a TV screen, a smartphone, a tablet, and a personal computer.

In some embodiments, the information source directly associated with the identified video content item can be in a first language, and the segment of text can be in a second language that is different from the first language.

Embodiments of a method for enriching a viewing experience of a user watching video content on a screen of a client terminal by increasing the relevance of additional media content proposed to the user, are disclosed. The method comprises providing at least a portion of a video content item to the client terminal, thereby causing playing the at least a portion of the video content item on the screen of the client terminal, obtaining a segment of text that is spoken in a sound track of the video content item, and identifying an occurrence of an ambiguous reference to a named entity in the segment of text, the ambiguous reference matching multiple candidate named entities. The method also comprises disambiguating the ambiguous reference, wherein the disambiguating comprises analyzing visual content of a segment of video from the video content item, and assigning one candidate named entity of the multiple candidate named entities to the ambiguous reference to a named entity, the assigning being based on a result of the analyzing. The method also comprises selecting one or more media content items that are related to the video content item, the selecting being based on the assigned one candidate named entity, and providing one media content item of the one or more media content items, thereby causing displaying the one media content item on the screen of the client terminal.

In some embodiments of the method, the disambiguating can additionally comprise identifying the video content item and identifying an information source, the information source being directly associated with the identified video content item; in addition, the assigning can also be based on information from the identified information source.

In some embodiments, the obtaining of the segment of text can include obtaining the segment of text from subtitles of the video content item. In some embodiments, the obtaining of the segment of text can include converting speech appearing in the sound track of the video content item into text using a speech-to-text conversion engine.

In some embodiments, the segment of video can include the identified occurrence of the ambiguous reference. In some embodiments, the segment of video can exclude the identified occurrence of the ambiguous reference. In some embodiments, the segment of video may include the segment of text. In some embodiments, it can be that at least a portion of the segment of text is not included in the segment of video.

In some embodiments, the disambiguating of the ambiguous reference can be done in parallel to the playing of the at least a portion of the video content item. In some embodiments, the providing of the one media content item can include causing the displaying on the screen of the client terminal of a proposal for displaying the one media content item, and receiving from the client terminal a request to display the one media content item. The request can be caused by an input provided by the user subsequent to the displaying of the proposal.

The displaying of the one media content item can be done in parallel to the playing of the at least a portion of the video content item. The displaying of the one media content item can be done subsequent to the playing of the at least a portion of the video content item. The displaying of the one media content item can be done while the playing of the at least a portion of the video content item is paused.

In some embodiments, the client terminal can include one of a smart TV, a Set-Top Box and a TV screen, a smartphone, a tablet, and a personal computer.

Disclosed herein are embodiments of a system for enriching a viewing experience of a user watching video content on a screen of a client terminal by increasing the relevance of additional media content proposed to the user. The system comprises one or more computer processors, non-transitory computer-readable storage medium storing program instructions for execution by the one or more computer processors; and one or more media content servers in data communication with the client terminal and operable to provide at least a portion of a video content item to the client terminal, so as to cause playing the at least a portion of the video content item on the screen of the client terminal, and also operable to provide a media content item, so as to cause displaying the media content item on the screen of the client terminal, wherein the media content item is one of one or more media content items selected by executing, by the one or more computer processors, the program instructions stored in the non-transitory computer-readable storage medium. The stored program instructions comprise first program instructions for identifying an occurrence of an ambiguous reference to a named entity in a segment of text that is spoken in a sound track of the video content item, the ambiguous reference matching multiple candidate named entities; second program instructions for disambiguating the ambiguous reference, the disambiguating comprising identifying the video content item, identifying an information source that is directly associated with the identified video content item, and assigning one candidate named entity of the multiple candidate named entities to the ambiguous reference, the assigning being done based on information obtained from the identified information source; and third program instructions for selecting the one or more media content items, the one or more media content items being related to the video content item, the selecting being based on the assigned one candidate named entity.

Disclosed herein are embodiments of a system for enriching a viewing experience of a user watching video content on a screen of a client terminal by increasing the relevance of additional media content proposed to the user. The system comprises one or more computer processors, non-transitory computer-readable storage medium storing program instructions for execution by the one or more computer processors; and one or more media content servers in data communication with the client terminal and operable to provide at least a portion of a video content item to the client terminal, so as to cause playing the at least a portion of the video content item on the screen of the client terminal, and also operable to provide a media content item, so as to cause displaying the media content item on the screen of the client terminal, wherein the media content item is one of one or more media content items selected by executing, by the one or more computer processors, the program instructions stored in the non-transitory computer-readable storage medium. The stored program instructions comprise first program instructions for identifying an occurrence of an ambiguous reference to a named entity in a segment of text that is spoken in a sound track of the video content item, the ambiguous reference matching multiple candidate named entities; second program instructions for disambiguating the ambiguous reference, the disambiguating comprising analyzing visual content of a segment of video from the video content item, and assigning one candidate named entity of the multiple candidate named entities to the ambiguous reference to a named entity, the assigning being done based on a result of the analyzing; and third program instructions for selecting the one or more media content items, the one or more media content items being related to the video content item, the selecting being based on the assigned one candidate named entity.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings:

FIG. 4 is a flow chart showing schematic representations of sub-steps of a method step that appears in FIGS. 2 and 3, according to some embodiments.

FIG. 7 is a flow chart showing schematic representations of sub-steps of a method step that appears in FIGS. 5 and 6, according to some embodiments.

DETAILED DESCRIPTION OF THE EMBODIMENTS

Figure 1A:
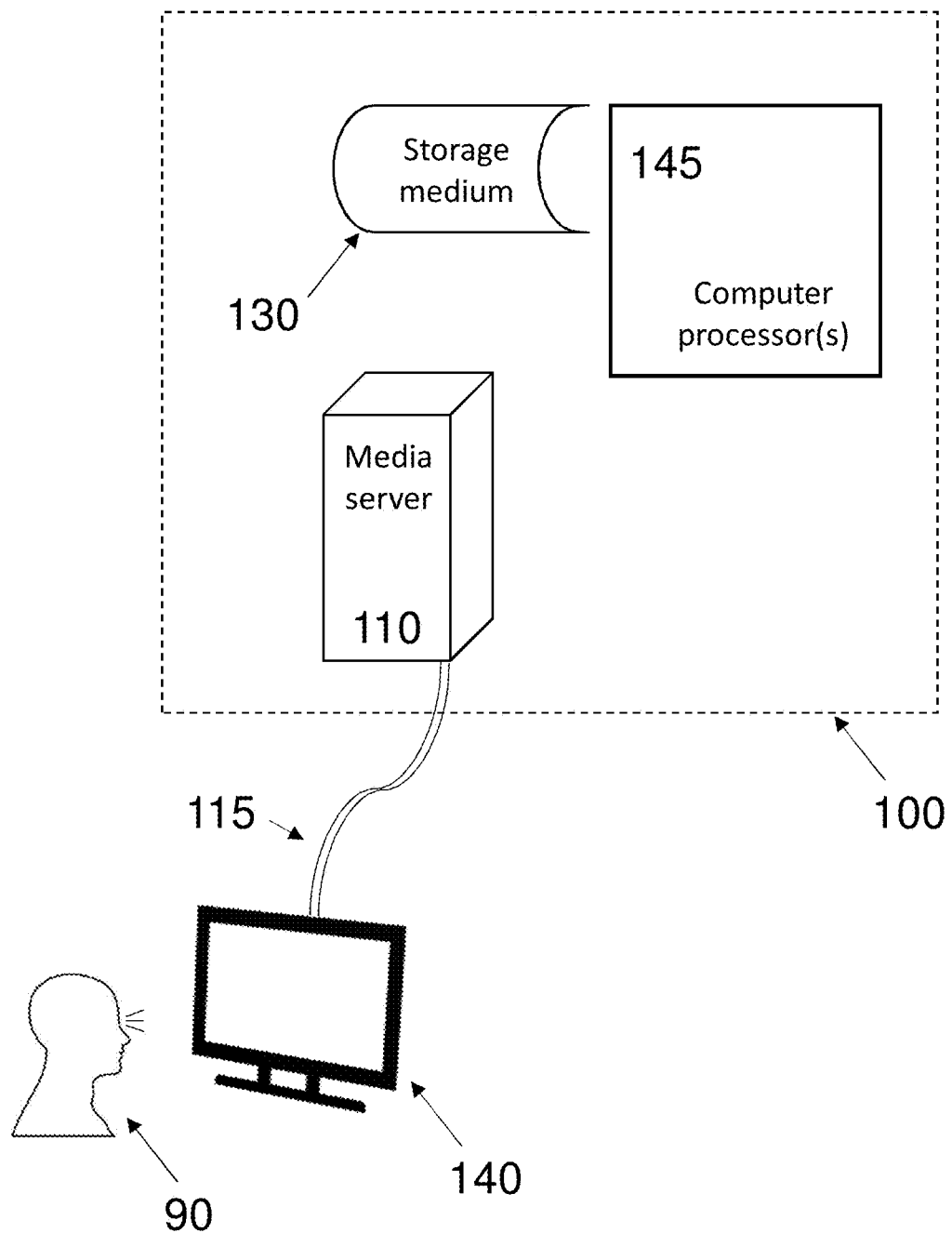
FIGS. 1A and 1B are block diagrams of a system for enriching a viewing experience of a user watching video content on a screen of a client terminal according to various embodiments, also showing the user and client terminal.

The proposed solutions described herein are based on the observation that one of the reasons for the relatively low success rate of prior art NED solutions is that they are intended to be general-purpose and target any application in which NED functionality is required.

The proposed solutions are further based on the observation that in the field of TV content enrichment there is extra information that is known at the time of conducting the NED analysis, information that does not exist in other NED application fields and is currently not used by NED algorithms. In some embodiments, this extra information is (i) we know that the analyzed text is taken from a sound track of a video content item that the user is currently watching, and (ii) we know the identity of that video content item. In some embodiments, this extra information is the video data of the video content item to which the analyzed text is related (as subtitles or audio sound track).

Consequently, the proposed solution deals only with NED conducted for the purpose of TV content enrichment, and is not a general-purpose solution.

In some embodiments, a first mode of NED implementation operates by performing the following steps:
  a. Obtaining the text to analyze.
  b. Identifying one or more references to named entities within the text.
  c. Determining which of the one or more references to named entities is ambiguous.
  d. If no ambiguous references, exiting.
  e. Obtaining the identity of the video content item from which the text is taken.
  f. Obtaining an information source directly associated with the video content item.
  g. Executing an improved Named Entity Disambiguation algorithm which takes advantage of information obtained from the directly associated information source.

In step a, the obtaining of the text can be from subtitles that are part of the video content item and can be displayed on the screen, providing either the text spoken in the video content item or a translation of it. Alternatively, the obtaining of the text can be from an automatic conversion of the spoken text to written text by a speech-to-text conversion engine.

In step b, the identifying of the one or more named entities is done according to the prior art methods of Named Entity Recognition.

In step c, the determining of which named entity is ambiguous is done according to the prior art methods of Named Entity Disambiguation.

In step e, the identity of the video content item is obtained. In some embodiments, the identity is obtained by the local playing terminal (e.g. smart TV or STB), which usually knows what is currently playing. This is always possible when the user picks his currently playing content item from local content in the terminal or from a VOD library of a TV operator. But even when the user is watching a linear TV channel, it is typically the case that the local terminal is aware of the identity of the currently playing video content item, as the local terminal has a copy of the EPG (Electronic Program Guide) which can tell the local terminal what is the currently playing program in any linear channel.

But even if the local terminal is for some reason not directly aware of the identity of the currently playing video content item, that information can be obtained by querying the TV operator's server, which always knows what is currently playing (except for the case of local content, in which case there is no question the local terminal knows the identity of the currently playing video content item). Therefore, in these embodiments, in all cases the local terminal is able to obtain the identity of the video content item. If any of the next steps, which require knowing the identity, is carried out by the TV operator's server and the identity is not known to the server, then the local terminal reports the identity of the video content item to the TV operator's server.

In other embodiments, the identity of the video content item is obtained by the TV operator's server. This is always possible when the currently playing video content item is picked from a VOD library or from a linear TV channel. But even if the video content item is picked from local content stored in the terminal, the server can obtain the identity from the local terminal. Therefore, in these other embodiments, in all cases the TV operator's server is able to obtain the identity of the video content item. If any of the next steps which requires knowing the identity is carried out by the local terminal and the identity is not known to the local terminal, then the server reports the identity of the video content item to the local terminal.

In step f, an information source directly associated with the currently playing video content item is obtained. As explained in greater length in the Definitions section under Definition "ee", the expression 'information source directly associated with a media content item' wherever used herein means an 'information source that includes information about the media content item when viewed as a whole.' This is different from the prior art in which all the information sources used by the NED algorithms are associated either with potential candidates for the ambiguous named entities or with words appearing in the context of the ambiguous named entities (i.e. in the analyzed text). For example, the websites proposed as extra sources of information in the KORE system mentioned above are always directly associated with the candidates for the ambiguous named entities and never with a video content item from which the named entities in question are extracted.

The obtained information source can be any information source satisfying the condition of being directly associated with the video content item from which the analyzed text is taken. The paragraphs below disclose several examples of such information sources, which examples do not limit the above statement or the scope of the invention.

An information source directly associated with the currently playing video content item which is applicable to linear TV channels can be obtained from the EPG of the TV system. Most EPGs contain not only names of the broadcasted programs, but also a brief summary (typically called "synopsis") providing information about the storyline, the cast, the location of filming, and the like.

Another information source directly associated with the currently playing video content item which is applicable to VOD content can be obtained from the VOD library of the TV operator, which also contains program summaries (synopses) similar to those in an EPG.

Another information source directly associated with a video content item is an advertisement for the video content item, which advertisement may be published on the Internet. In some embodiments, the advertisement can be a graphic advertisement, which can undergo visual analysis for its content.

Another information source directly associated with a video content item is a review of the video content item, which review may be published on the Internet. The review may be a critique from a professional critic or from ordinary viewers. In some embodiments, the review can be a video review, which can undergo visual or textual analysis for its content.

Still another information source directly associated with a video content item is an entry associated with the video content item in a dictionary, an encyclopedia, a database or a knowledge-base. For example, the TV series "House of Cards" has an entry in Wikipedia which can be used as an information source by the proposed NED algorithm when disambiguating an ambiguous reference to a named entity appearing in the sound track of an episode of that TV series. The dictionary, encyclopedia, database or knowledge-base containing the information source directly associated with the video content item need not be the same as the dictionary, encyclopedia, database or knowledge-base containing information sources used for other stages of the NED algorithm. For example, the information source directly associated with the currently playing video content item can be obtained from the IMDb database, while the rest of the NED algorithm may be using Wikipedia pages.

Still another information source directly associated with a video content item is an account in a social network, where the account is dedicated to the video content item. For example, the creators of a movie may open and advertise a Facebook account for the movie, in which they post news and anecdotes about it. Or a fan of the movie may open a Facebook account for the movie, in which he posts his views about it.

In step g, use is made of information obtained from the information source directly associated with the video content item, in a way that enhances the NED algorithm. The examples and explanations below provide more details about this step, but do not limit the above statement or the scope of the invention.

For example, information obtained from the information source directly associated with the video content item may be used for computing relatedness scores of competing candidates for a given ambiguous reference to a named entity. Such relatedness scores are herein called "content-item-relatedness scores," as they are based on information directly associated with the video content item from which the ambiguous reference to named entity is taken. For each of the competing candidates a comparison is made against text obtained from the information source (which can be, for example, any one of the examples of information sources directly associated with the video content item described above), and a content-item-relatedness score is computed. The content-item-relatedness scores obtained this way can be used in computing the total relatedness scores, with other relatedness scores (that may be similar to relatedness scores of the prior art) also contributing to the total relatedness scores.

The algorithms used to calculate the content-item-relatedness scores may be similar to algorithms used by prior art NED systems for calculating regular relatedness scores between two blocks of text. For example, a NED algorithm may calculate a regular relatedness score between two Wikipedia entries by counting shared incoming links. Similarly, if the text obtained from the information source directly associated with the video content item for the purpose of calculating content-item-relatedness scores is a Wikipedia page corresponding to the video content item, then the same relatedness computation algorithm used for calculating regular relatedness scores (e.g. counting shared incoming Wikipedia links) may be used for calculating the content-item-relatedness scores. If, however, the text obtained from the information source directly associated with the video content item for the purpose of calculating content-item-relatedness scores is not a Wikipedia page, as is the case when it is taken from an EPG, then the content-item-relatedness scores may be computed by other algorithms. For example, the text obtained from the information source (e.g. the synopsis from the EPG) and the Wikipedia page of a candidate named entity may both be treated as bags-of-words and the words shared by both of them are counted: The higher the count, the higher the content-item-relatedness score assigned to the candidate.

In some embodiments, a second mode of NED implementation operates by performing the following steps:
a. Obtaining the text to analyze.
b. Identifying one or more references to named entities within the text.
c. Determining which of the one or more references to named entities is ambiguous.
d. If no ambiguous references, exit.
e. Obtaining video data of the video content item from which the text is taken.
f. For each specific candidate for each ambiguous reference to a named entity in the analyzed text, analyzing a video segment corresponding in time to the mentioning of the relevant reference in the analyzed text, in order to find relatedness or connection between the specific candidate and the corresponding video segment.
g. Executing an improved Named Entity Disambiguation algorithm which takes advantage of the relatedness or connection information.

In step a, the obtaining of the text can be from subtitles that are part of the video content item and can be displayed on the screen, providing either the text spoken in the video content item or a translation of it. Alternatively, the obtaining of the text can be from an automatic conversion of the spoken text to written text by a speech-to-text conversion engine.

In step b, the identifying of the one or more named entities is done according to the prior art methods of Named Entity Recognition.

In step c, the determining of which named entity is ambiguous is done according to the prior art methods of Named Entity Disambiguation.

In step e, video data of the video content item from which the analyzed text was taken is obtained. In some embodiments, the step is carried out by the local terminal (e.g. smart TV or STB). If the user picked his currently playing content item from local content stored in the local terminal, then the video data is available to the processor of the local terminal from the local storage device of the local terminal. But if the user picked the currently playing content from a VOD library or from a linear channel of the TV operator, the content item is typically streamed in real-time from the TV operator and is not usually locally stored by default. In such case it is preferable that a local terminal implementing this step of the NED algorithm (or at least part of it) records the streamed video content, possibly using a connected device with digital video recording functionality, so that it is available to the local terminal for analysis. The storing does not have to last long, as the video content is required to be available only until the disambiguating of the currently playing video segment ends. If any of the next steps, which require having access to the video data of the video content item, is carried out by the TV operator's server and the video data is not accessible to the server (e.g. when the video content item is picked from local storage), then the local terminal provides the video data to the TV operator's server.

In other embodiments, the step is carried out by the TV operator's server. If the user picked his currently playing content item from a VOD library or from a linear TV channel, then the TV operator's server has access to video data of the currently playing video content item. If the user picked his currently playing content item from local storage, then the server obtains the video data from the local terminal. If any of the next steps which requires having access to the video data of the video content item is carried out by the local terminal and the video data is not accessible to the local terminal (e.g. when the video content item is picked from a VOD library and the local terminal does not record it), then the server provides the video data to the local terminal.

In step f, for each ambiguous reference to a named entity in the analyzed text, video data of a video segment corresponding in time to the appearance of the reference in the analyzed text is analyzed, in order to determine the relatedness or connection between the video segment and each candidate for the ambiguous reference to a named entity in the analyzed text.

For example, when the ambiguous reference is known to refer to a person and the multiple candidates are different people who may match the ambiguous reference (i.e. having the same name), we may obtain pictures of each of the candidates (for example: from Wikipedia). Then a visual analysis of the video segment (or of a portion of it or of one or more still images of the segment that serve as a representative sample of the segment) is performed in order to find out (for each candidate) whether the relevant picture (or a similar picture) appears somewhere in the segment. A relatedness score may be assigned to each candidate, when a good match between the video segment and the candidate's picture gets a high score and a weak match gets a low score.

As another example, when the ambiguous reference is known to refer to a location (e.g. a town, a neighborhood, a street, etc.) and the multiple candidates are different locations that may match the ambiguous reference (i.e. towns in different states having the same name, neighborhoods in different towns having the same name, streets in different neighborhoods having the same name, etc.), we may search the video data for textual information that may shed light on the intended named entity. For example, if the candidates are streets of the same name that exist in multiple cities, then the analysis of the video data may detect a street sign or a shop sign that discloses the name of the city, thus resolving the correct identification of the ambiguous reference. Or alternatively, the visual analysis may try to match a picture of a candidate location (for example obtained from Wikipedia) to visual scenery shown in the video segment.

It should be noted that it is not always the case that the class of the ambiguous reference is known, as was the case in the previous examples. For example, it may be the case that the ambiguous reference may be either a person or a location, as in the "Washington" example previously mentioned. In such case the analysis of the visual content might require applying multiple methods, both those applicable for people and those applicable for locations.

As stated above, this step determines relatedness or connection between a candidate and the relevant video segment. By "connection" it is meant here reaching a result that specifies the similarity or relevance by a value that is one of a discrete set of possible values having no more than three alternatives. For example {Yes, No} or {Yes, No, Undecided}. By "relatedness" it is meant here reaching a result that specifies the similarity or relevance in finer detail on a scale having more than three possible values. This may be an analog scale or a digital scale having at least four possible values.

It should be noted that the analyzed text might not have a detectable correlation to a narrow video segment that directly corresponds in time to an appearance of an ambiguous reference to a named entity currently under analysis. It might be, for example, that a person is shown in the video content at a specific moment but the audio track mentions his name only after a minute or two. Or that a location is shown in the video content at a specific moment but the audio track mentions its name one or two minutes earlier. Therefore, it is important that the selection of the video segment to analyze for a given ambiguous reference to a named entity (i.e. the video segment corresponding in time to the mentioning of the relevant reference in the analyzed text) will be broad enough to contain early and late occurrences of the reference in the video content. On the other hand, it is undesirable to select the analyzed video segment too broadly, because that might badly affect the performance of the system because of the heavier processing required for analyzing a longer video segment. Reasonable coverage can typically be obtained with segments that are between plus/minus ten seconds to plus/minus three minutes around the ambiguous reference appearance. The video segment to analyze need not necessarily be symmetric around the ambiguous reference appearance, for example covering an interval starting one minute before and ending two minutes after the appearance of the reference.

It should also be noted that if the currently playing content item is streamed in real-time from the TV operator and is not locally stored, then there is difficulty in providing both real-time analysis of the visual content and symmetry of the analyzed video segment around the ambiguous reference appearance. This is because at the time of appearance of the ambiguous reference the video immediately following it is still not available.

This issue may be resolved, for example, in one of the following two ways:

i. Delaying the NED decision. For example, if the video segment analyzed for relatedness to a candidate is plus/minus one minute around the appearance of the named entity, then carrying out the analysis with a one-minute delay, so that the desired two-minute segment can be analyzed.

ii. Giving up detection of early appearances of the named entity. With this approach the analysis takes place immediately with or closely after the appearance of the ambiguous reference in the analyzed text, and only the portion of the relevant video segment that is already known at that time is used. This implies that if the audio track mentions the named entity before it appears in the visual content, then the matching might not be detected. In some embodiments, it is thus possible that the appearance of the named entity will fall outside the time interval corresponding to the analyzed video segment. In other words, it is possible that the analyzed segment of text in which the ambiguous reference is found will fully or partially fall outside the time interval corresponding to the analyzed video segment.

In step g, use is made of the relatedness or connection information found in the previous step, in a way that enhances the NED algorithm. The examples and explanations below provide more details about this step, but do not limit the above statement or the scope of the invention.

For example, when the ambiguous reference is known to refer to a person and there are three persons that are candidates for matching the reference to a named entity, the visual analysis step may determine a binary conclusion for the appearance of pictures of each of the candidates in the video content, resulting for example in a {No, Yes, No} visual-connections vector. In this case the visual analysis clearly directs us to a conclusion that the second candidate is the right one, as it is the only person out of the three whose face appears in the video segment. Therefore, the NED implementation may give heavy weight to the visual analysis and use it as the sole deciding factor.

If, however, the connections vector was found to be {No, Yes, Yes}, then the NED algorithm may conclude the correct solution is either the second or third candidate, but certainly not the first. In this case the decision cannot be taken based solely on the visual analysis, and the NED algorithm would have to apply its non-visual methods for deciding.

As another example, when the ambiguous reference is known to be a location and there are three locations that are candidates for matching the reference to a named entity, the visual analysis step may use a high-resolution relatedness scale for measuring similarity between images of the candidate locations and the video content, resulting for example in a {0.34, 0.56, 0.49} visual-relatedness vector. In this case the visual analysis does not provide a clear-cut conclusion, and the NED algorithm should treat the visual analysis as one more input contributing to the decision process, on top of all other inputs used in prior art NED algorithms.

We will now present detailed examples of how, according to various embodiments, content-item-relatedness scores and/or visual-relatedness scores may be used for disambiguating an ambiguous reference to a named entity appearing in a sound track of a video content item, which disambiguating is in turn used for content enrichment decisions.

In a first example illustrating, inter alia, the use of content-item-relatedness scores, a reference to the named entity "Washington" is detected to exist in the sound track of the movie "Disclosure" watched by a user. For the sake of simplicity, we assume that this is the only reference to a named entity detected within a currently analyzed segment of text (e.g. corresponding to a one-minute long audio segment taken from the audio track of the movie).

The content enrichment process for the first example may then include the following steps:
  a. Wikipedia is consulted for "Washington". It is found there is a disambiguation page for "Washington" in which it is stated that the name commonly refers to: (i) the first president of the United states, (ii) a state of the United States, (iii) the capital of the United States, (iv) the metropolitan area around the capital of the United States, (v) the federal government of the United States, and (vi) a person other than the first president of the United States.
  b. A preliminary filtering step is applied for decreasing the number of candidate interpretations. The last two candidates are determined to be the least probable out of the six candidates and are dropped from further consideration. Such determination may be based, for example, on frequency scores pre-calculated for each named entity in Wikipedia based on statistics of occurrence in sound tracks of movies and TV programs.
  c. The Wikipedia page for each of the remaining four candidates is retrieved.
  d. A context-relatedness score is computed for each of the four remaining candidates, measuring the relatedness of its Wikipedia page to the context of the reference to the "Washington" named entity. In this example the context is the complete segment of text that is currently under analysis. Any prior art algorithm for computing relatedness between two segments of text may be used.
  In this example, the resulting context-relatedness scores for {president, state, capital, metropolitan area} are determined to be {60, 50, 25, 10} on a scale of 0 to 100 (the higher the number—the more related are the compared items). In prior art systems that rely only on context-relatedness scores these results decide the disambiguation issue, choosing the first candidate interpretation (president) to be the correct one because it has the highest context-relatedness score of all remaining candidates. However, this is not necessarily the case in the proposed solution, as is demonstrated in the next steps.
  e. The video content item from which the analyzed segment of text is taken is identified to be the "Disclosure" movie.
  f. The Wikipedia page associated with the "Disclosure" movie is retrieved.
  g. A content-item-relatedness score is computed for each of the four remaining candidates, measuring the relatedness of its Wikipedia page to the video content item containing the reference to the "Washington" named entity. In this example the information source directly associated with the video content item is the Wikipedia page for the "Disclosure" movie, and therefore the relatedness is measured between a Wikipedia page of a candidate and the Wikipedia page of the movie.
  In this example, the resulting content-item-relatedness scores for {president, state, capital, metropolitan area} are determined to be {50, 80, 15, 20} on a scale of 0 to 100.
  h. The context-relatedness scores and the content-item-relatedness scores are combined into one set of total-relatedness scores. This can be done by averaging the two scores for each remaining candidate, resulting in {55, 65, 20, 15}. Alternatively and equivalently, this can be done by adding the two scores for each remaining candidate, resulting in {110, 130, 40, 30}. As each of the numbers in the last computation is by definition equal to twice its corresponding number in the previous result, both computations always lead to the same end result, which in this example is selection of the second candidate interpretation (state) to be the correct one, as it has the highest total-relatedness score of all remaining candidates.
  i. Now that it is determined that the reference to "Washington" is a reference to Washington State, the content enrichment engine looks for one or more media content items that are related to Washington State in order to recommend them to the user. In this example the media content items that are proposed to the user are the movies "Free Willy" and "Sleepless in Seattle", which were either (at least partially) filmed in Washington State or have a plot that (at least partially) occurs in Washington State.

In the above example equal importance is given to relatedness of the candidates to the context of the reference to the ambiguous named entity and to relatedness of the candidates to the information source directly associated with the video content item in which the reference appears. It should be noted that the two relatedness scores measure different characteristics. A context-relatedness score measures a "local" relatedness that represents relatedness between a candidate interpretation and the immediate vicinity of the reference. A content-item-relatedness score measure a "global" relatedness that represents relatedness between a candidate interpretation and the video content item as a whole.

Therefore, the context-related scores tend to be "jumpy" and change with time while a video content item is playing, while the content-item-related scores are stable while playing a single video content item. For many content enrichment applications, stability of recommendations is a desired feature. In such cases the content-item-relatedness scores should get a heavier weight than the context-relatedness scores. For example, the content-item-relatedness scores may be given three times the weight of the context-relatedness scores. Applying this weight to the example above results in total-relatedness scores of {210, 290, 70, 70}. In this example the use of weights did not change the bottom-line conclusion of selecting Washington State, but it is easy to realize that in other examples the use of weights may result in a different selection than when no weights are used.

It should be noted that the proposed solution of improving the effectiveness of NED tasks is applicable to all types of NED algorithms, whether semantic or not. However, as explained above, the solution is intended for NED tasks which serve the goal of enhancing the viewing experience of video content items, when the sound tracks of the video content items contain the references to named entities which should be disambiguated.

It should also be noted that the language of the information source directly associated with the video content item may be different from the language of the text that is being analyzed. For example, the video content item may be an episode of the American television show "Friends" with a Spanish sound track, so that the analyzed text is in Spanish. The information source selected for supporting the disambiguation task may be the "Friends" page in the English Wikipedia.

In such a case it is preferred, even though not absolutely necessary, that for the computation of the content-item-relatedness scores, the texts corresponding to the candidate named entities will be in the language of the information source, so that the same relatedness calculation algorithms used for the single-language case will also be applicable without modifications. In the above example, if the content-item-relatedness scores are computed by comparing the text obtained from the information source to Wikipedia pages of the candidates, then it is preferred to use the English Wikipedia pages of the candidates for that purpose, even if the Spanish Wikipedia pages of the candidates are the ones used for determining the context-relatedness scores of the candidates.

In a second example illustrating, inter alia, the use of visual-relatedness, the example shows that it can be that visual-relatedness scores alone do not provide a clear-cut conclusion, in which case additional relatedness inputs are required (as in the previous example). The additional inputs in this example are context-relatedness scores, which indicate the level of relatedness of a candidate (e.g. the Wikipedia page corresponding to the candidate) to the context in which the ambiguous reference appears (e.g. the paragraph of the analyzed text containing the ambiguous reference). Algorithms for calculating relatedness scores between two blocks of text are well known in the art, for example based on treating both texts as bags-of-words and counting the words shared by both texts. The larger is the count, the higher is the relatedness score.

In this second example, a reference to the named entity "Washington" is again (i.e., like in the first example) detected to exist in the sound track of the movie "Disclosure" watched by a user. For the sake of simplicity, we assume that this is the only reference to a named entity detected within a currently analyzed segment of text (e.g. corresponding to a one minute long audio segment taken from the audio track of the movie).

The content enrichment process for the second example may then include the following steps:

Steps a through d—the same as in the first example above.

e. A video segment is extracted from the movie "Disclosure", the video segment including the point in time in which the reference to "Washington" appears.

f. A visual-relatedness score is computed for each of the four remaining candidates, measuring its relatedness to the visual content of the extracted video segment. In order to determine these scores, the Wikipedia pages of all four candidates are accessed and relevant pictures are downloaded—a picture of George Washington, a picture of the flag of Washington State, a picture of the seal of Washington state, an aerial view of Seattle, a view of Downtown Seattle from Queen Anne Hill, a picture of the flag of Washington D.C., a picture of Lincoln Memorial in Washington D.C., a picture of the White House, a picture of the Capitol, a picture of Arlington National Cemetery, etc. Each of the downloaded pictures is matched against the extracted video segment, looking for appearances of the picture or part of it in the video segment, including geometrically distorted appearances.

In addition, the extracted video segment is analyzed for appearances of Latin characters. Such appearances may provide hints for the correct interpretation of the ambiguous reference.

In this example, the flag of Washington State is found to appear in three locations within the video segment, the view of downtown Seattle appears in two locations, the picture of George Washington appears twice, and all the other pictures are not detected at all. Additionally, the characters "Seat" are determined to appear on a building in one location in the video segment. Based on those findings, the resulting visual-relatedness scores for {president, state, capital, metropolitan area} are determined to be {50, 90, 0, 0} on a scale of 0 to 100.

g. The context-relatedness scores and the visual-relatedness scores are combined into one set of total-relatedness scores. This can be done by averaging the two scores for each remaining candidate, resulting in {55, 70, 12.5, 5}. Alternatively and equivalently, this can be done by adding the two scores for each remaining candidate, resulting in {110, 140, 25, 10}. As each of the numbers in the last computation is by definition equal to twice its corresponding number in the previous result, both computations always lead to the same end result, which in this example is selection of the second candidate interpretation (state) to be the correct one, as it has the highest total-relatedness score of all remaining candidates.

h. As in the first example, it is now determined that the reference to "Washington" is a reference to Washington State, and the content enrichment engine looks for one or more media content items that are related to Washington State in order to recommend them to the user. Once again, in this example the media content items that are proposed to the user are the movies "Free Willy" and "Sleepless in Seattle", which were either (at least partially) filmed in Washington State or have a plot that (at least partially) occurs in Washington State.

In the above second example, equal importance is given to relatedness of the candidates to the context of the ambiguous reference to the named entity and to relatedness of the candidates to the visual image of the video content item in which the reference appears. It should be noted that the two relatedness scores measure different characteristics. A context-relatedness score measures an "aural" relatedness that represents relatedness between a candidate interpretation and the audio track of the video content item. A visual-relatedness score measures a "visual" relatedness that represents relatedness between a candidate interpretation and the video track of the video content item.

For many content enrichment applications, visual relatedness is considered more important than aural relatedness. In such cases the visual-relatedness scores should get a heavier weight than the context-relatedness scores. For example, the visual-relatedness scores may be given three times the weight of the context-relatedness scores. Applying this weight to the example above results in total-relatedness scores of {210, 320, 25, 10}. In this example the use of weights did not change the bottom-line conclusion of selecting Washington State, but it is easy to realize that in other examples the use of weights may result in a different selection than when no weights are used.

It should be noted that the proposed solution of improving the effectiveness of NED tasks is applicable to all types of NED algorithms, whether semantic or not. As explained above, the solution is intended for NED tasks which serve the goal of enhancing the viewing experience of video content items, when the sound tracks of the video content items contain the references to named entities which should be disambiguated.

Methods of analyzing visual content for identifying appearances of text characters are well known in art, and any such method may be used in implementing the proposed solution. Examples for such methods can be seen in U.S. Pat. Nos. 6,608,930, 6,823,084, 7,031,553, 8,320,674, and US Patent Publication 2011/0123115, all of which are incorporated herein by reference in their entirety.

Methods of analyzing visual content for identifying appearances of faces are well known in the art, and any such method may be used in implementing the proposed solution. Examples for such methods can be seen in U.S. Pat. Nos. 5,012,522, 5,715,325, US Patent Publication 2008/0080743, and US Patent Publication 2012/0250950, all of which are incorporated herein by reference in their entirety.

Methods of performing general-purpose Named Entity Disambiguation that are not specific to enhancing the viewing experience of video content items are well known in the art, and any such method may be used in implementing the proposed solution. Examples for such methods can be seen in U.S. Pat. No. 7,672,833, US Patent Publication 2007/0233656, US Patent Publication 2008/0208864, US Patent Publication 2009/0144609, and US Patent Publication 2011/0106807, all of which are incorporated herein by reference in their entirety.

It should be clear to the skilled practitioner that parallel elements of the two detailed examples can be combined in various ways. For example, for some content enrichment applications, a total relatedness score can be a function of all three of: a context-relatedness score, a content-relatedness score, and a visual-relatedness score. As another example, if two (or more) candidates are tied after the tallying of a total relatedness score based on a content-relatedness score and a context-relatedness score, as used in the first detailed example, then a visual-relatedness score calculated as described in the second detailed example might be used as a 'tie-breaker' in order to complete the disambiguating. Similarly, if two (or more) candidates are tied after the tallying of a total relatedness score based on a visual relatedness score and a context-relatedness score, as used in the second detailed example, then a content-relatedness score calculated as described in the first detailed example might be used as a 'tie-breaker' in order to complete the disambiguating.

Referring now to the figures, and specifically to FIGS. 1A, 1B, 1C, 1D and 1E, a system 100 for enriching a viewing experience of a user 90 watching a video content item 201 on a screen of a client terminal 140 is illustrated. (It should be noted that the contents of FIGS. 1A, 1B, 1C, 1D and 1E all relate to the same system 100 according to some embodiments, and FIGS. 1A, 1B, 1C, 1D and 1F all relate to the same system 100 according to other embodiments.) The term "video content item" has the meaning given in Definition "x" in the "Definitions" section. It can also be said here that the user 90 is watching video content, or a segment of video (as defined in Definition "mm"). A segment of video content item 201 is a portion of video content item 201, including a portion equal to video content item 201. The client terminal 140 is illustrated in the form of a flat-screen television, but can be any device including a display. According to various example embodiments it can alternatively be one of a 'smart' television, a smartphone, a tablet, a set-top box and television screen, and a personal computer. In other embodiments the display of client terminal 140 can be one of a two-dimensional or holographic projection and a virtual reality viewer.

Figure 1B:
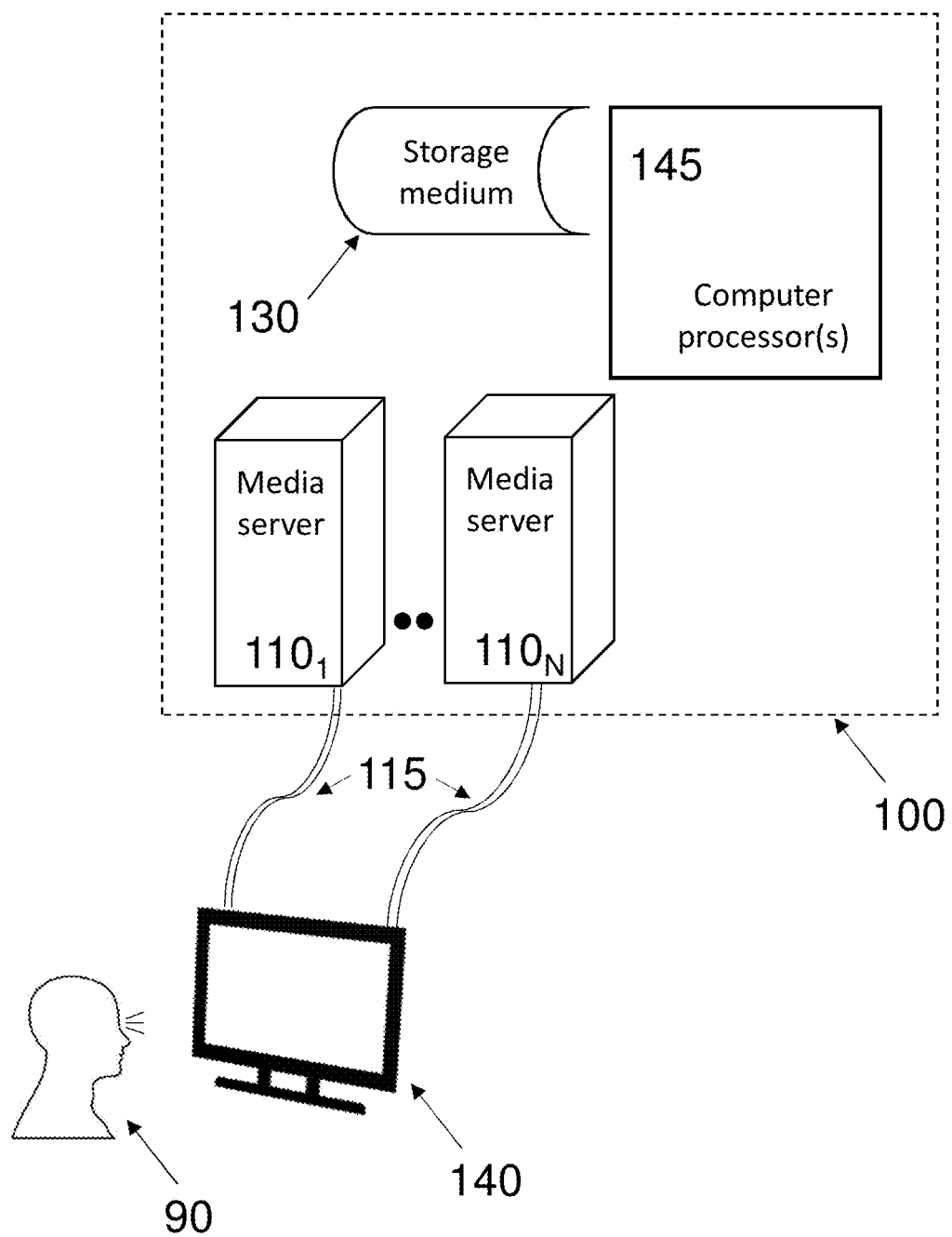

As shown in FIGS. 1A and 1B, the system 100 comprises at least one media server 110, which is connected electronically to the client terminal 140 by electronic communications means 115. The form of electronic communications means 115 shown in the figures is not intended to illustrate any specific connection means such as a physical cable, and should be understood as schematically representing any electronic communications means, which can be for example coaxial cable, wireless communication, or the Internet, or any other suitable electronic communications means. Media server 110 can alternatively comprise a single media server 110 or multiple media servers $110_1 \ldots 110_N$, where N is the number of media servers in the system 100. A media server, as is known in the art, is a computing device, generally comprising non-transitory storage, that is operative to have media content delivered, downloaded and/or streamed therefrom or therethrough. Thus, the electronic communications means 115 between the one or more media servers 110 and the client terminal 140 can be used for transmitting media content, including, but not exhaustively, video content and audio content, between the one or more media servers 110 and the client terminal 140. In some embodiments, the electronic communications means 115 can be used to transmit inputs received from user 90. In one non-limiting example, an input from a user 90 can comprise a request to display a specific one media content item 202, the request caused by an input provided by the user 90 subsequent to the displaying of a proposal to display the one media content item 202.

Figure 1C:
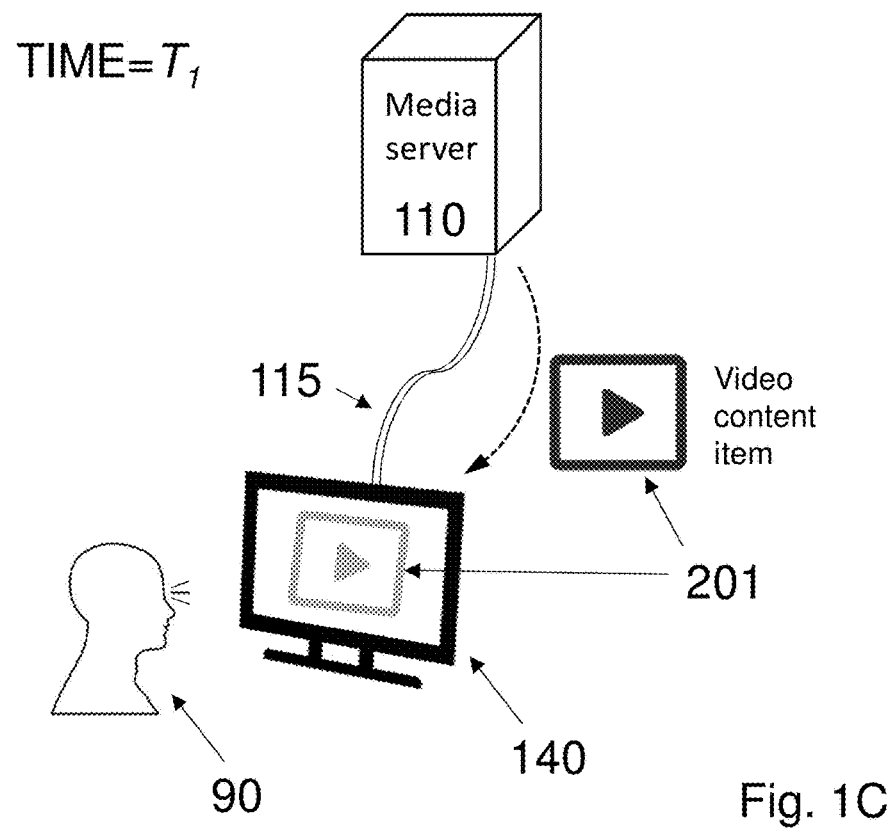
FIGS. 1C and 1D are block diagrams of the media server of FIG. 1A, according to various embodiments, respectively delivering a video content item at Time=$T_1$ and a media content item at Time=$T_2$.
Figure 1D:
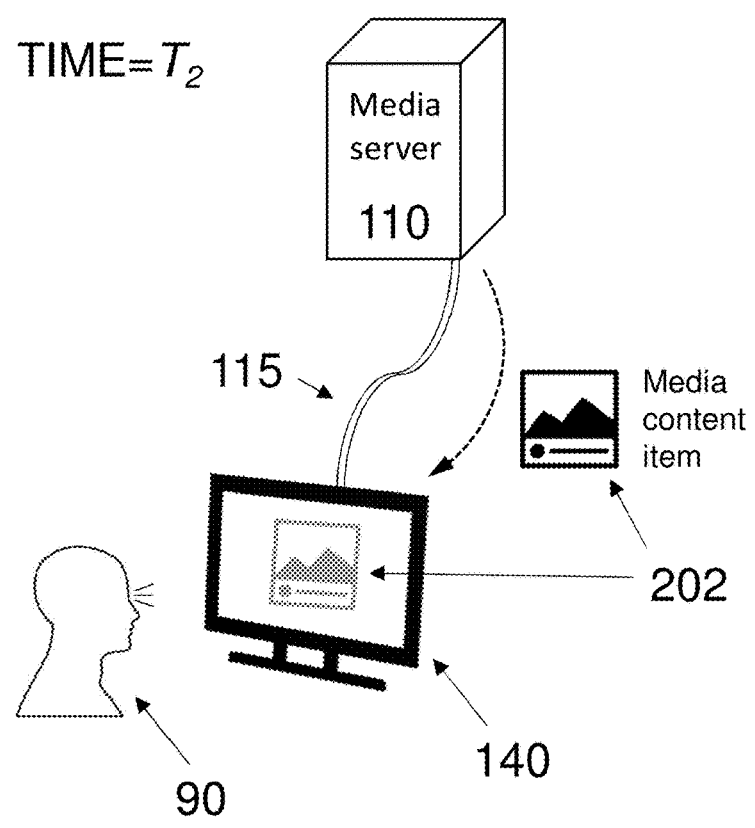
Figure 1E:
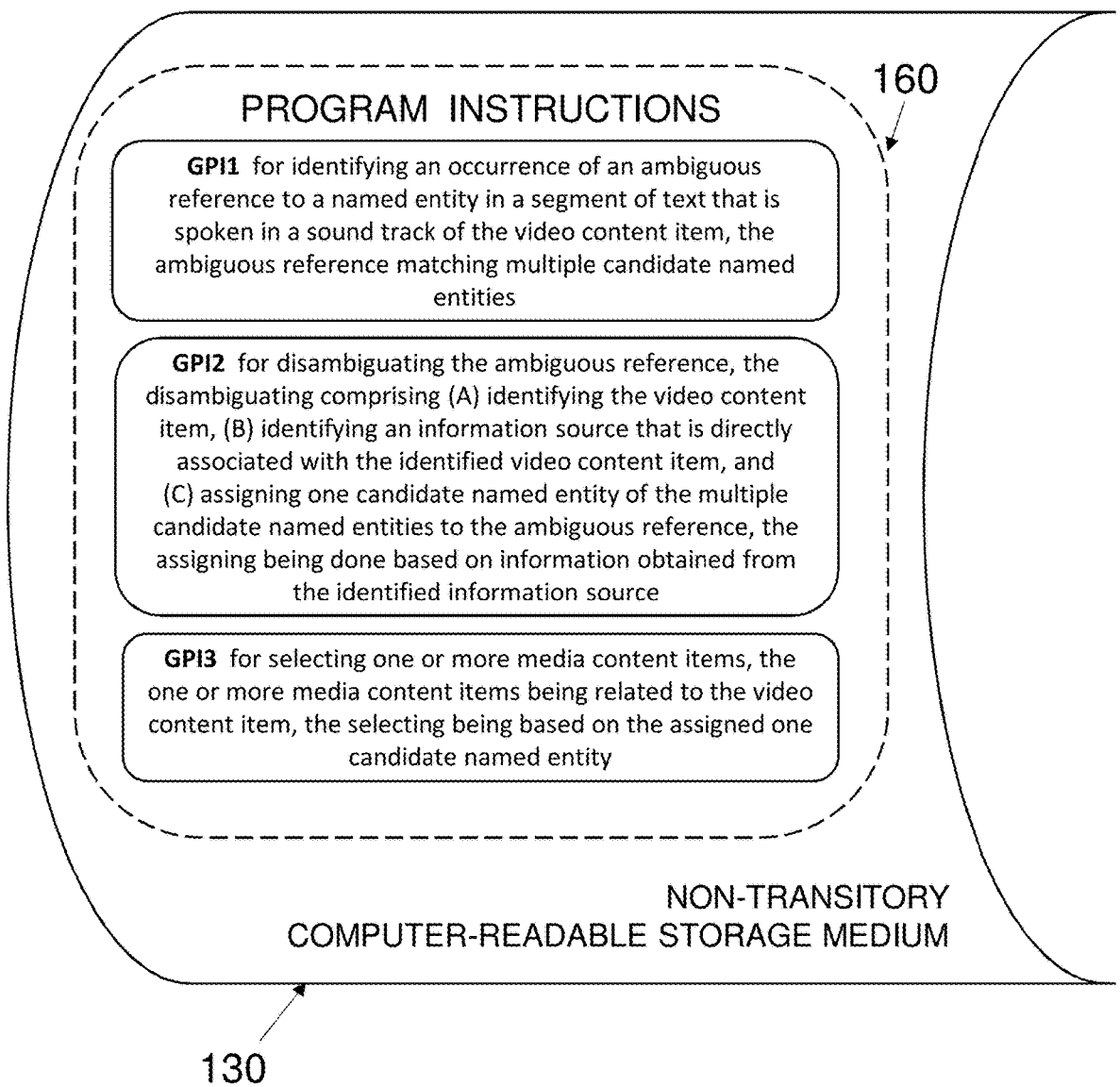
FIGS. 1E and 1F show schematic representations of computer-readable storage media and groups of program instructions stored thereon, according to some embodiments.
Figure 1F:
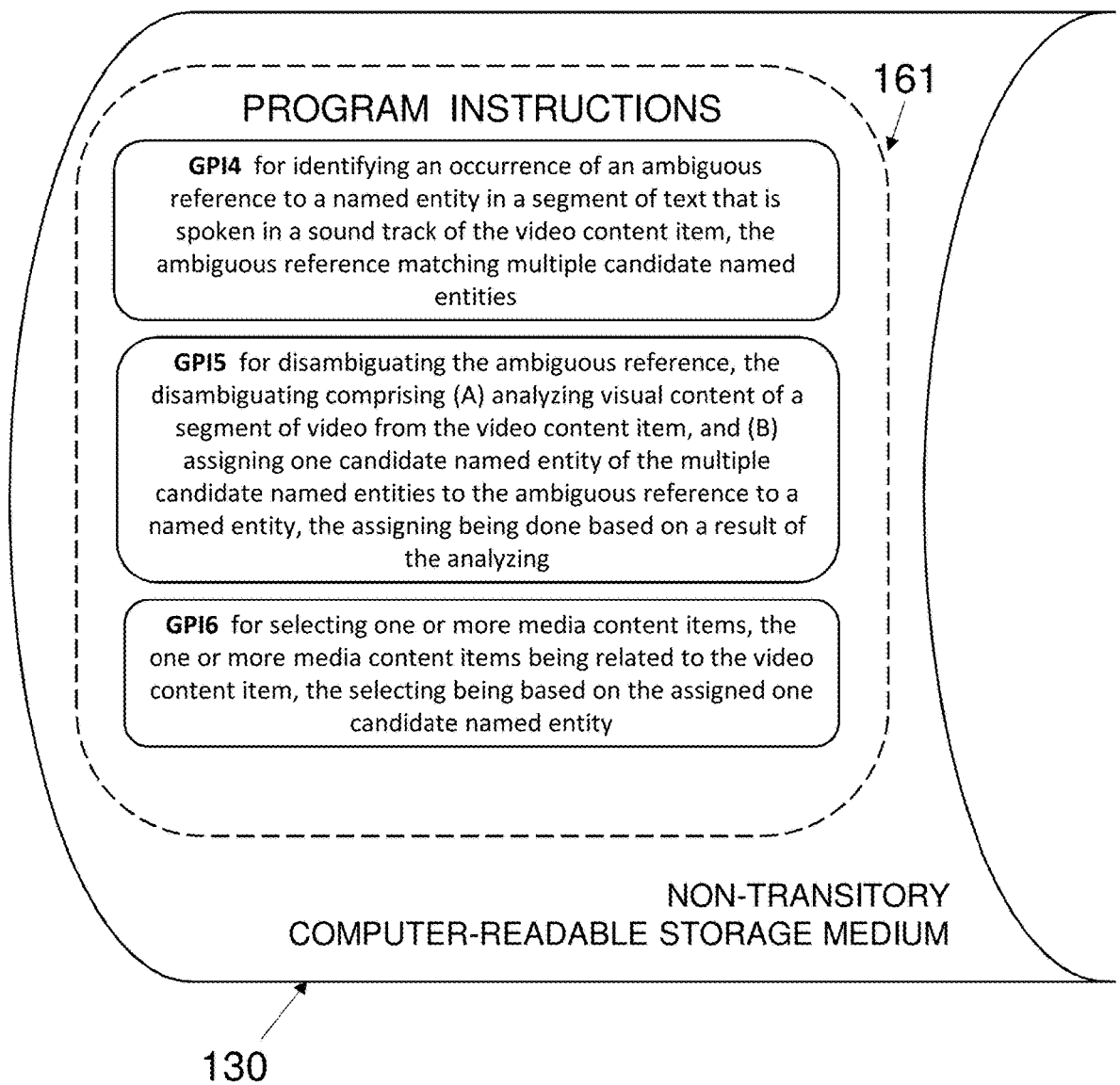

The one or more media server(s) 110 is/are operable to (i) provide at least a portion of a video content item 201 to the client terminal 140, so as to cause playing the at least a portion of the video content item 201 on the screen of the client terminal 140, and (ii) provide a media content item 202, so as to cause displaying the media content item 202 on the screen of the client terminal 140. In some embodiments, as illustrated in FIGS. 1C and 1D, the media server 110 can be operable to provide the at least a portion of a video content item 201 to the client terminal 140 (so as to cause playing the at least a portion of the video content item 201 on the screen of the client terminal 140) at a first time interval $T_1$, and to provide the media content item 202 (so as to cause displaying the media content item 202 on the screen of the client terminal 140) at a second time interval $T_2$. According to some embodiments, $T_2$ can be later than $T_1$, in which case the media content item 202 is provided and displayed on the client terminal 140 subsequent to the playing of the video content item 201 on the client terminal 140. In other embodiments, $T_2$ can be fully or partially overlapping with $T_1$, in which case the media content item 202 can be provided (and displayed on the client terminal 140) either (a) while the video content item 201 is playing or (b) while the video content item 201 is paused by the user 90 or by the media server 110.

As also shown in FIGS. 1A and 1B, the system 100, according to some embodiments, can additionally comprise one or more computer processors 145, and storage medium 130, which is a non-transitory, computer-readable medium. The one or more computer processors 145 are operative to execute program instructions 160 stored in the storage medium 130. The program instructions 160, which are represented schematically in FIG. 1E, include three groups of program instructions: GPI1, GPI2 and GPI3, where each group of instructions GPI1, GPI2 and GPI3 includes program instructions for carrying out a portion of a method for enriching a viewing experience of a user watching video content on a screen of a client terminal by increasing the relevance of additional media content proposed to the user. The three groups comprise:

a. Group of program instructions GPI1 including program instructions for identifying an occurrence of an ambiguous reference to a named entity in a segment of text that is spoken in a sound track of the video content item, the ambiguous reference matching multiple candidate named entities.
   b. Group of program instructions GPI2 including program instructions for disambiguating the ambiguous reference, the disambiguating comprising (A) identifying the video content item, (B) identifying an information source that is directly associated with the identified video content item, and
      (C) assigning one candidate named entity of the multiple candidate named entities to the ambiguous reference, the assigning being done based on information obtained from the identified information source.
   c. Group of program instructions GPI3 including program instructions for selecting one or more media content items, the one or more media content items being related to the video content item, the selecting being based on the assigned one candidate named entity.

The exemplary system illustrated in FIGS. 1A-1E (i.e., including 1E and not 1F) is suitable for practicing the method described in the first detailed example above, i.e., the example that includes use of content-item-relatedness scores.

In some other embodiments, the one or more computer processors 145 are operative to execute program instructions 161 stored in the storage medium 130. The program instructions 161, which are represented schematically in FIG. 1F, include three groups of program instructions: GPI4, GPI5 and GPI6, where each group of instructions GPI4, GPI5 and GPI6 includes program instructions for carrying out a portion of a method for enriching a viewing experience of a user watching video content on a screen of a client terminal by increasing the relevance of additional media content proposed to the user, the three groups comprising:

a. Group of program instructions GPI4 including program instructions for identifying an occurrence of an ambiguous reference to a named entity in a segment of text that is spoken in a sound track of the video content item, the ambiguous reference matching multiple candidate named entities. Group of program instructions GPI4 is the same as group of program instructions GPI1 as discussed with respect to FIG. 1E, and is interchangeable therewith.
   b. Group of program instructions GPI5 including program instructions for disambiguating the ambiguous reference, the disambiguating comprising (A) analyzing visual content of a segment of video from the video content item, and (B) assigning one candidate named entity of the multiple candidate named entities to the ambiguous reference to a named entity, the assigning being done based on a result of the analyzing.
   c. Group of program instructions GPI6 including program instructions for selecting one or more media content items, the one or more media content items being related to the video content item, the selecting being based on the assigned one candidate named entity. Group of program instructions GPI6 is the same as group of program instructions GPI3 as discussed with respect to FIG. 1E, and is interchangeable therewith.

The exemplary system illustrated in FIGS. 1A-1D and 1F (i.e., including 1F and not 1E) is suitable for practicing the method described in the second detailed example above, i.e., the example that includes use of visual-relatedness scores.

Figure 2:
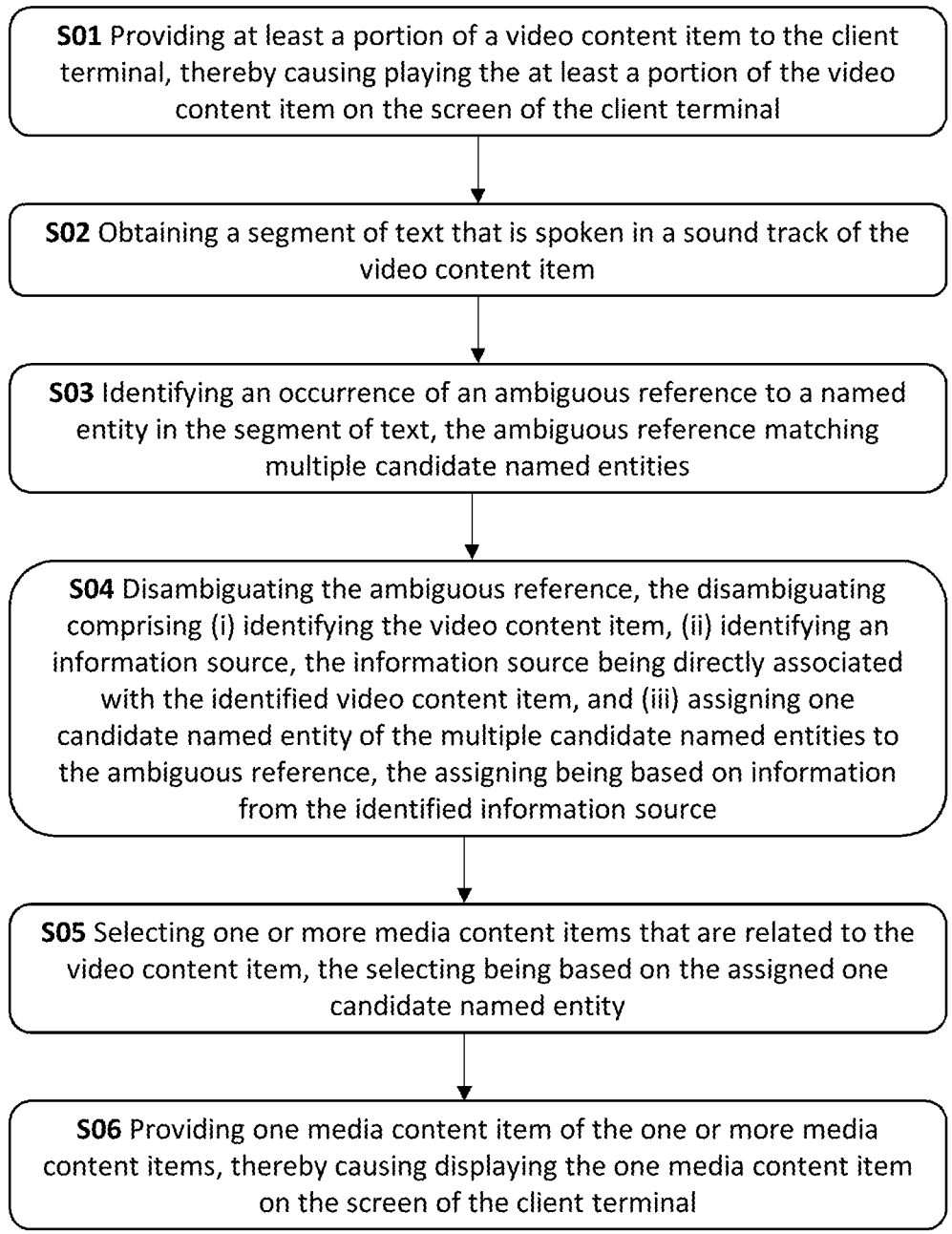
FIGS. 2 and 3 are flow charts of methods for enriching a viewing experience of a user watching video content on a screen of a client terminal, according to various embodiments.

Referring now to FIG. 2, a method is disclosed for enriching a viewing experience of a user watching video content on a screen of a client terminal by increasing the relevance of additional media content proposed to the user. The method can suitably be performed using any of the system embodiments discussed above with respect to FIGS. 1A-1E (but not 1F), wherein one or more media content servers in data communication with the client terminal are operable to (i) provide at least a portion of a video content item to the client terminal, so as to cause playing the at least a portion of the video content item on the screen of the client terminal, and (ii) provide a media content item, so as to cause displaying the media content item on the screen of the client terminal. The method, as shown in the flow chart of FIG. 2, comprises the following steps:

a. Step S01, providing at least a portion of a video content item to the client terminal, thereby causing playing the at least a portion of the video content item on the screen of the client terminal. As mentioned earlier, examples of a client terminal include, but not exhaustively, a 'smart' television, a smartphone, a tablet, a set-top box and television screen, a personal computer, a two-dimensional or holographic projection, and a virtual reality viewer.
   b. Step S02, obtaining a segment of text that is spoken in a sound track of the video content item. In some embodiments, the segment of text can be obtained from subtitles of the video content item and/or obtained by converting speech appearing in the sound track of the video content item into text using a speech-to-text conversion engine.
   c. Step S03, identifying an occurrence of an ambiguous reference to a named entity in the segment of text, the ambiguous reference matching multiple candidate named entities.
   d. Step S04, disambiguating the ambiguous reference, the disambiguating comprising (i) identifying the video content item, (ii) identifying an information source, the information source being directly associated with the identified video content item, and (iii) assigning one candidate named entity of the multiple candidate named entities to the ambiguous reference, the assigning being based on information from the identified information source.

The disambiguating can be done in parallel to the playing of the at least a portion of the video content item of Step S01. The information source directly associated with the identified video content item can be, to name a few non-limiting examples, a synopsis (which can be obtained from an electronic program guide or from a video-on-demand library), an advertisement, or a review. Other non-limiting examples include: an entry in a database, a knowledge base, a dictionary or an encyclopedia (where the entry corresponds to the identified video content item), including, for example IMDB or Wikipedia, and an account dedicated to the identified video content item in a social network. In some embodiments, the information source directly associated with the identified video content item can be in a different language than the segment of text obtained in Step S02.

e. Step S05, selecting one or more media content items that are related to the video content item, the selecting being based on the assigned one candidate named entity.

f. Step S06, providing one media content item of the one or more media content items, thereby causing displaying the one media content item on the screen of the client terminal. The displaying can be done in parallel to the playing of the at least a portion of the video content item of Step S01, or subsequent thereto, or while the playing is paused.

Any of the steps in the method, and in fact any of the steps in any of the methods disclosed herein, can be implemented either in the system 100, i.e., on the server side, or in the client terminal.

Figure 3:
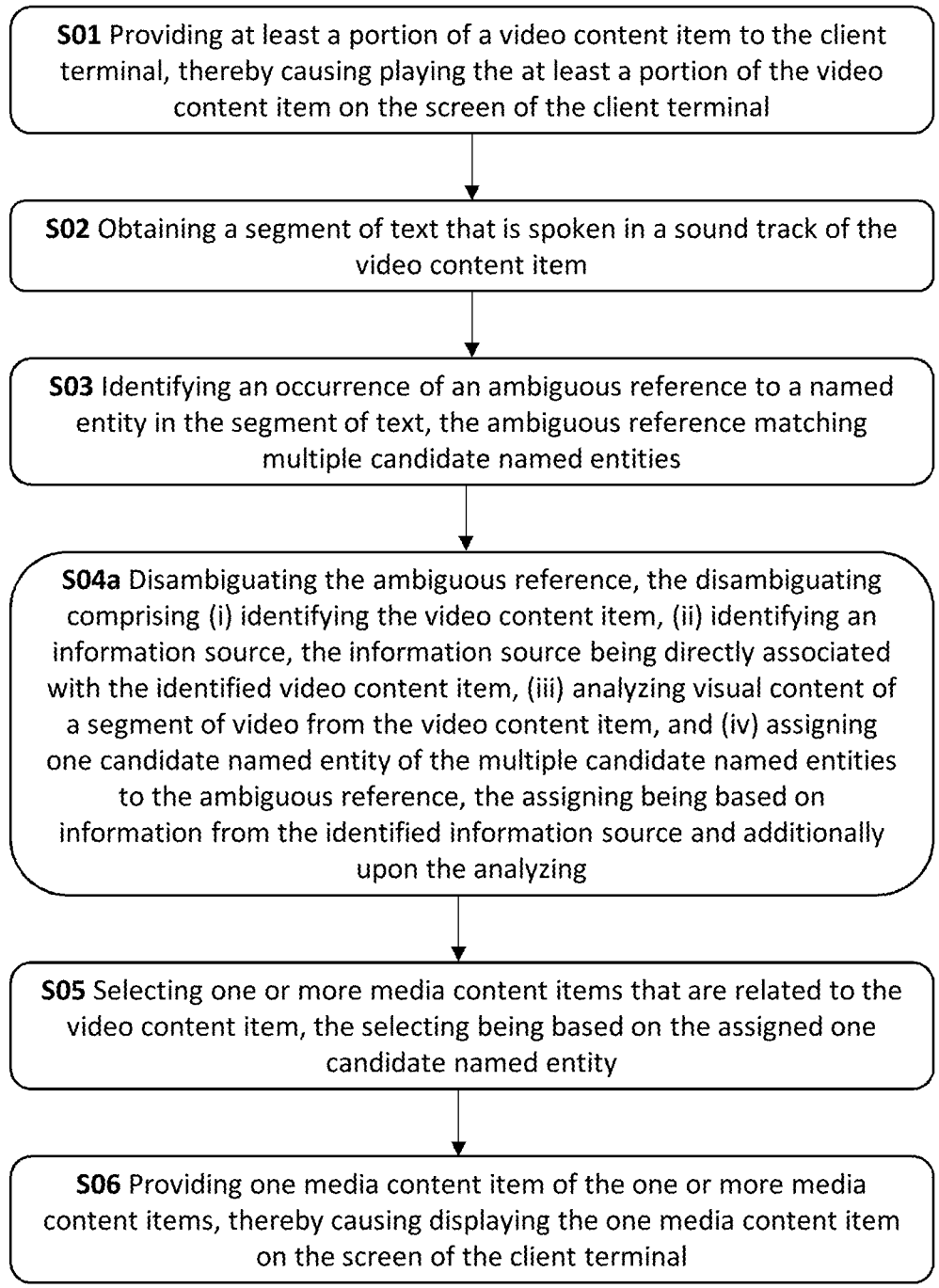

In some embodiments, as illustrated in the flow chart of FIG. 3, the method can include all of the Steps S01, S02, S03, S05 and S06, which are represented in FIG. 2, but with Step S04a replacing Step S04. In Step S04a, the disambiguating additionally comprises analyzing visual content of a segment of video from the video content item, and the assigning is also being based on a result of the analyzing. Thus, Step S04a comprises:

d. Step S04a, disambiguating the ambiguous reference, the disambiguating comprising (i) identifying the video content item, (ii) identifying an information source, the information source being directly associated with the identified video content item, (iii) analyzing visual content of a segment of video from the video content item, and (iv) assigning one candidate named entity of the multiple candidate named entities to the ambiguous reference, the assigning being based on information from the identified information source and additionally upon the analyzing. As discussed with respect to Step S04, the disambiguating can be done in parallel to the playing of the at least a portion of the video content item of Step S01. The information source directly associated with the identified video content item can be, to name a few non-limiting examples, a synopsis (which can be obtained from an electronic program guide or from a video-on-demand library), an advertisement, or a review. Other non-limiting examples include: an entry in a database, a knowledge base, a dictionary or an encyclopedia (where the entry corresponds to the identified video content item), including, for example IMDB or Wikipedia, and an account dedicated to the identified video content item in a social network. In some embodiments, the information source directly associated with the identified video content item can be in a different language than the segment of text obtained in Step S02.

In some embodiments, as illustrated in FIG. 4, Step S06 can include sub-steps S06-I and S06-II as follows:

a. Sub-step S06-I Causing displaying on the screen of the client terminal a proposal for displaying the one media content item.

b. Sub-step S06-II Receiving from the client terminal a request to display the one media content item, the request caused by an input provided by the user subsequent to the displaying of the proposal.

Figure 5:
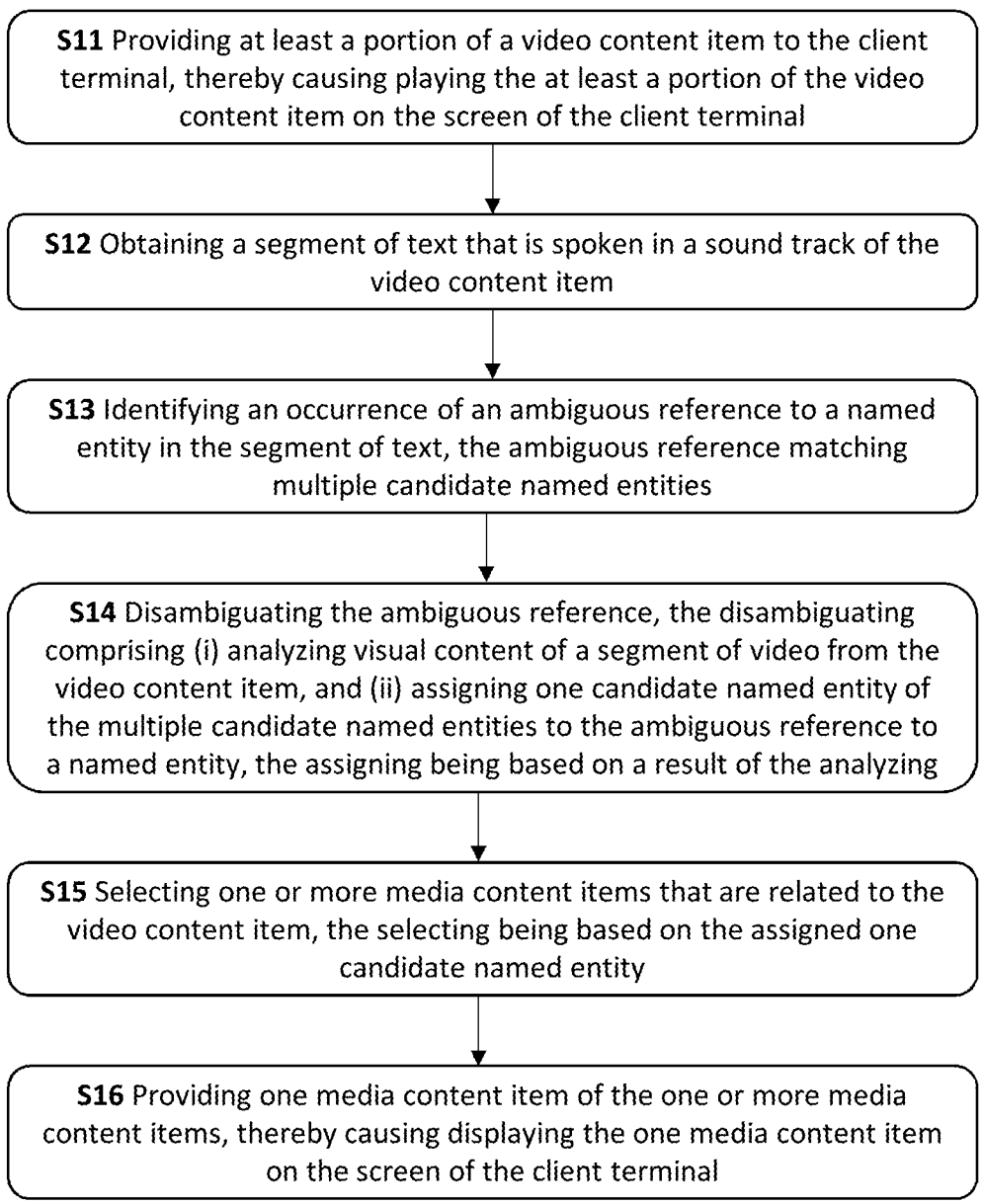
FIGS. 5 and 6 are flow charts of methods for enriching a viewing experience of a user watching video content on a screen of a client terminal, according to various embodiments.

Referring now to FIG. 5, a method is disclosed for enriching a viewing experience of a user watching video content on a screen of a client terminal by increasing the relevance of additional media content proposed to the user. The method can suitably be performed using any of the system embodiments discussed above with respect to FIGS. 1A-1D and 1F (but not 1E), wherein one or more media content servers in data communication with the client terminal are operable to (i) provide at least a portion of a video content item to the client terminal, so as to cause playing the at least a portion of the video content item on the screen of the client terminal, and (ii) provide a media content item, so as to cause displaying the media content item on the screen of the client terminal. The method, as shown in the flow chart of FIG. 5, comprises the following steps:

a. Step S11, providing at least a portion of a video content item to the client terminal, thereby causing playing the at least a portion of the video content item on the screen of the client terminal. As mentioned previously, examples of a client terminal include, but not exhaustively, a 'smart' television, a smartphone, a tablet, a set-top box and television screen, a personal computer, a two-dimensional or holographic projection, and a virtual reality viewer.

b. Step S12, obtaining a segment of text that is spoken in a sound track of the video content item. In some embodiments, the segment of text can be obtained from subtitles of the video content item and/or obtained by converting speech appearing in the sound track of the video content item into text using a speech-to-text conversion engine.

c. Step S13, identifying an occurrence of an ambiguous reference to a named entity in the segment of text, the ambiguous reference matching multiple candidate named entities.

d. Step S14, Disambiguating the ambiguous reference, the disambiguating comprising (i) analyzing visual content of a segment of video from the video content item, and (ii) assigning one candidate named entity of the multiple candidate named entities to the ambiguous reference to a named entity, the assigning being based on a result of the analyzing. The disambiguating can be done in parallel to the playing of the at least a portion of the video content item of Step S11. In some embodiments, the segment of video includes the identified occurrence of the ambiguous reference, and in other embodiments it does not. In some embodiments, the segment of video includes the segment of text, and in some embodiments, at least a portion of the segment of text is not included in the segment of video.

e. Step S15, selecting one or more media content items that are related to the video content item, the selecting being based on the assigned one candidate named entity.

f. Step S16, providing one media content item of the one or more media content items, thereby causing displaying the one media content item on the screen of the client terminal. The displaying can be done in parallel to the playing of the at least a portion of the video content item of Step S11, or subsequent thereto, or while the playing is paused.

Figure 6:
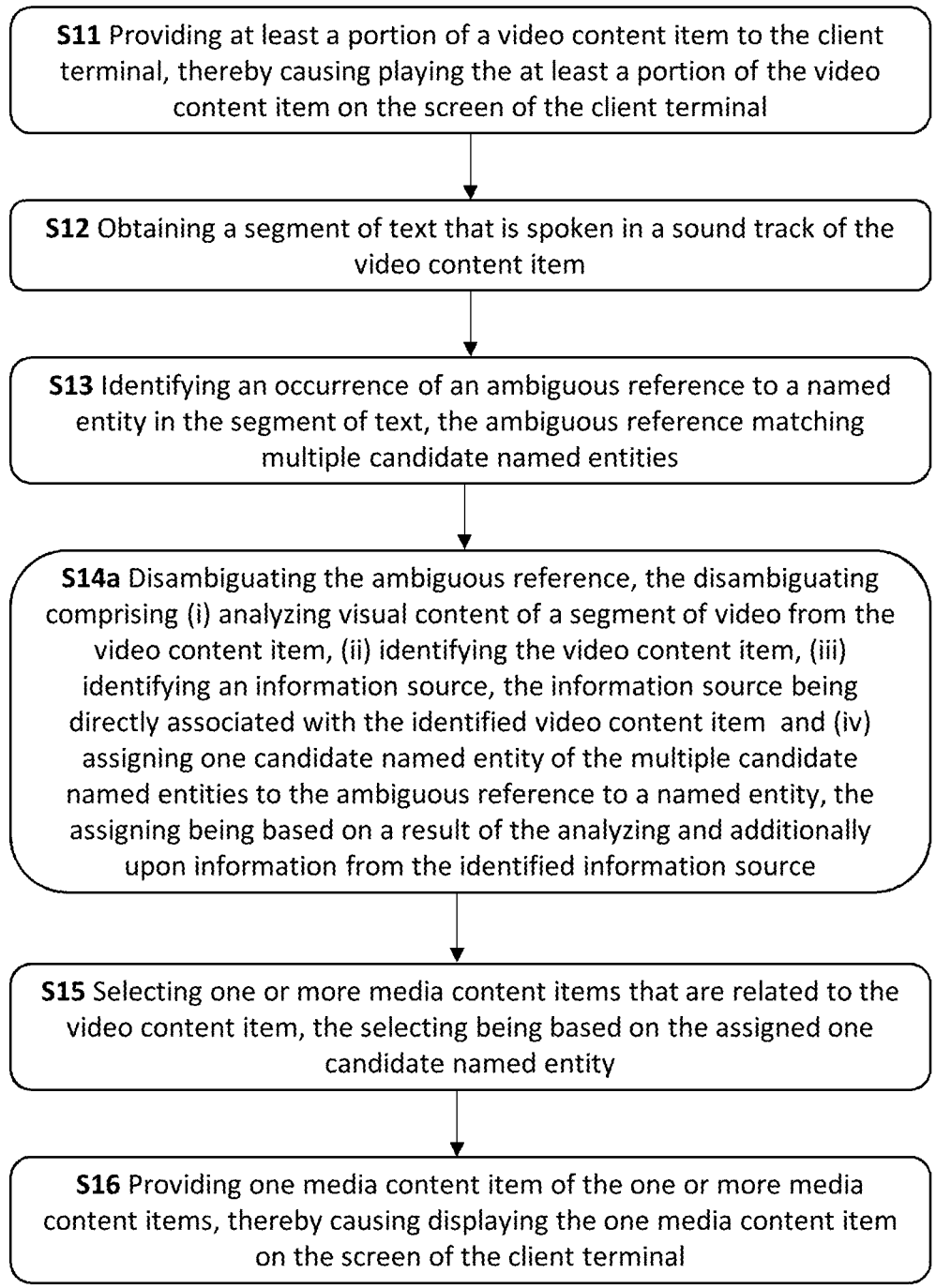

In some embodiments, as illustrated in the flow chart of FIG. 6, the method can include all of the Steps S11, S12, S13, S15 and S16, which are represented in FIG. 5, but with Step S14a replacing Step S14. In Step S14a, the disambiguating additionally comprises (A) identifying the video content item and (B) identifying an information source, the information source being directly associated with the identified video content item. In addition, the assigning is also being based on information from the identified information source. Thus, Step S14a comprises:

d. Step S14a, Disambiguating the ambiguous reference, the disambiguating comprising (i) analyzing visual content of a segment of video from the video content item, (ii) identifying the video content item, (iii) identifying an information source, the information source being directly associated with the identified video content item, and (iv) assigning one candidate named entity of the multiple candidate named entities to the ambiguous reference to a named entity, the assigning being based on a result of the analyzing and additionally upon information from the identified information source. As discussed with respect to Step S14, the disambiguating can be done in parallel to the playing of the at least a portion of the video content item of Step S11.

In some embodiments, as illustrated in FIG. 7, Step S16 can include sub-steps S16-I and S16-II as follows:

a. Sub-step S16-I Causing displaying on the screen of the client terminal a proposal for displaying the one media content item.

b. Sub-step S16-II receiving from the client terminal a request to display the one media content item, the request caused by an input provided by the user subsequent to the displaying of the proposal.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

Definitions

This disclosure should be interpreted according to the definitions below.

In case of a contradiction between the definitions in this Definitions section and other sections of this disclosure, this section should prevail.

In case of a contradiction between the definitions in this section and a definition or a description in any other document, including in another document included in this disclosure by reference, this section should prevail, even if the definition or the description in the other document is commonly accepted by a person of ordinary skill in the art.

a. "NLP" or "Natural Language Processing"—The field of computer science, artificial intelligence and computational linguistics concerned with the interactions between computers and human (natural) languages, and, in particular, concerned with programming computers to fruitfully process large natural language texts.

b. "entity"—Something that exists as itself, as a subject or as an object, actually or potentially, concretely or abstractly, physically or not. It need not be of material existence. In particular, abstractions and legal fictions are regarded as entities. There is also no presumption that an entity is animate, or present. Examples of types of entities are a person entity, a location entity, an organization entity, a media content item entity, a topic entity and a group entity.

Note that the term "entity" does not refer to the text referencing the subject or the object, but to the identity of the subject or the object.

c. "person entity"—A real person entity, a character entity or a role entity.

d. "real person entity"—A person that currently lives or that had lived in the past, identified by a name (e.g. John Kennedy) or a nickname (e.g. Fat Joe).

e. "character entity"—A fictional person that is not alive today and was not alive in the past, identified by a name or a nickname. For example, "Superman", "Howard Roark", etc.

f. "role entity"—A person uniquely identified by a title or by a characteristic. For example, "the $23^{rd}$ president of the United States", "the oldest person alive today", "the tallest person that ever lived", "the discoverer of the penicillin", etc.

g. "location entity"—An explicit location entity or an implicit location entity.

h. "explicit location entity"—A location identified by a name (e.g. "Jerusalem", "Manhattan $6^{th}$ Avenue", "Golani Junction", "the Dead Sea") or by a geographic locator (e.g. "ten kilometers north of Golani Junction", "100 degrees East, 50 degrees North").

i. "implicit location entity"—A location identified by a title or a by a characteristic (e.g. "the tallest mountain peak in Italy", "the largest lake in the world").

j. "organization entity"—An organization identified by a name (e.g. "the United Nations", "Microsoft") or a nickname (e.g. "the Mossad").

k. "media content item entity"—A media content item identified by a name (e.g. "Gone with the Wind" is a media content item entity that is a movie, and "Love Me Do" is a media content item entity that is a song).

l. "topic entity"—A potential subject of a conversation or a discussion. For example, the probability that Hillary Clinton will win the presidential election, the current relations between Russia and the US, the future of agriculture in OECD countries, the Mercedes-Benz S-Class car models.

m. "group entity"—A group of entities of any type. The different member entities of a group may be of different types.

n. "nickname of an entity"—Any name by which an entity is known which is not its official name, including a pen name, a stage name and a name used by the public or by a group of people to refer to it or to address it.

o. "named entity"—An entity that is identified by a name or a nickname and not by other types of description. For example, "Jerusalem" is a named entity, but "the tallest building in Jerusalem" is not a named entity (even though it is a perfectly valid entity, that is uniquely identified).

p. "NEW" or "Named Entity Recognition"—The task of recognizing the occurrence of a reference to a named entity within a text, without necessarily identifying the identity of the specific named entity referred to by the reference.

q. "NED" or "Named Entity Disambiguation"—The task of determining the identity of a specific named entity referred to by a reference to a named entity occurring in a text, when the reference can match the identities of multiple candidate named entities. The disambiguation results in assigning one of the identities of the multiple candidate named entities to the reference occurring in the text.

Note that the task of Named Entity Disambiguation also includes the initial step of determining that an occurrence of a reference to a named entity is ambiguous and requires disambiguation. However, the task of Named Entity Disambiguation does not include the determining of the identity of a specific named entity when the occurrence of the reference to the named entity in the text can only match the identity of a single named entity, as there is no need for disambiguation in such case.

r. "ambiguous reference to a named entity"—An occurrence of a reference to a named entity in a text that can match the identities of multiple candidate named entities.

s. "ambiguous named entity"—A short way of saying "ambiguous reference to a named entity", without explicitly mentioning the reference to the named entity. Note that, strictly speaking, the term is not accurate, because it is not the named entity that is ambiguous but the reference to the named entity, and therefore the term should always be understood as referring to an implicit reference to the named entity.

t. "disambiguating a reference to named entity"—The operation of assigning an identity of a specific named entity to an ambiguous reference to a named entity occurring in a text.

u. "disambiguating a named entity"—A short way of saying "disambiguating a reference to a named entity", without explicitly mentioning the reference to the named entity. Note that, strictly speaking, the term is not accurate, because it is not the named entity that is being disambiguated but the reference to the named entity, and therefore the term should always be understood as referring to an implicit reference to the named entity.

v. "media content item"—a stand-alone unit of media content that can be referred to and identified by a single reference and can be played independently of other content. For example, a movie, a TV program, an episode of a TV series, a video clip, an animation, an audio clip, or a still image.

w. "audio content item"—a media content item that contains only an audio track hearable using a speaker or a microphone, but does not contain a visual track.

x. "video content item"—a media content item that contains a visual track viewable on a screen. A video content item may or may not additionally contain an audio track.

y. "audio" and "aural" are used as synonyms herein.

z. "video" and "visual" are used as synonyms herein.

aa. "audio channel" and "audio track" are used as synonyms herein. Both refer to an audio component of a media content item.

bb. "video channel" and "video track" are used as synonyms herein. Both refer to a video component of a media content item. A still image is a special case of video track.

cc. "media playing device"—a device that is capable of playing a media content item. For example, an audio-only player that is capable of playing an audio content item, a video-only player that is capable of playing a video content item, a combined video/audio player that is capable of playing both the video channel and the audio channel of a media content item in parallel.

dd. "identifying a media content item"—finding an attribute of the media content item that allows searching for and locating the media content item or information related to the media content item. The attribute may be a name of the media content item, a web address (URL) pointing to a copy of the media content item, an identification number of the media content item within a given library or collection of media content items, an identification number of the media content item that is globally unique, etc. The attribute value does not have to be globally unique as long as it is practically possible to use it for the searching and locating. For example, a movie can be identified by a name even where there are several movies having the same name, as long as it is possible to search in some database or search engine using the name and thus find the media content item or information related to it (even if a manual selection between several alternatives is required).

ee. "information source directly associated with a media content item"—An information source that includes information about the media content item when viewed as a whole. In other words, an information source that is associated with the media content item when it refers to the media content item as a named unit. For example, a review of a given movie, an advertisement for a given movie, a synopsis of a given movie appearing in an EPG or in a VOD library, a website dedicated to a given movie, a social network account dedicated to a given movie, and a Wikipedia page written about a given song, are all information sources directly associated with the relevant media content item (the given movie or the given song). On the other hand, an article about the career of an actor that happens to appear in a given movie and a video clip taken in a beach in which a given movie was filmed are not information sources that are directly associated with the given movie.

Note that an information source that is directly associated with a given media content item may also include information that is only indirectly associated with the given media content item. For example, a review of a movie is directly associated with the movie even if it also contains information about the career of the main actor.

Also note that an information source that is directly associated with a given media content item may be a part of an aggregate of information sources, each directly associated with a different entity. For example, a synopsis of a given movie may appear in an EPG, with the EPG containing multiple synopses of multiple movies and TV shows. Or a Wikipedia page written about a given song may be a part of the Wikipedia encyclopedia containing multiple pages about multiple songs, multiple movies and even multiple entities that are not media content items.

ff. "a first media content item related to a second media content item"—A first media content item that has any connection to the second media content item. The relation may be a direct relation, in which case one of the two media content items explicitly refers to the other media content item. Alternatively, the relation may be an indirect relation, in which case both media content items have a connection to some other entity (e.g. a common actor appearing in two movies, a common location in which both movies were filmed, or one media content item being about some historical figure while the other media content item mentioning that historical figure in its sound track). Note that being related is a reflexive relation—if media content item A is related to media content item B, then it is also the case that media content item B is related to media content item A.

gg. "EPG" or "Electronic Program Guide"—A guide containing scheduling information about current and upcoming media content programming, and optionally also about past media content programming. Optionally, an EPG may also contain other information about media content items, in addition to their schedule. For example, an EPG may contain synopses of the media content items included in its scheduling range.

hh. "VOD" or "Video On Demand"—A service which allows users to select and watch video content items such as movies and TV shows when they choose to, rather than having to watch at a specific broadcast time.

ii. "subtitles"—Text derived from either a transcript or a screenplay of a dialog or commentary in movies, television programs and the like, displayable on the screen while the movie or program is being played. Subtitles can either be a translation of text spoken in the movie or program into a different language, or a rendering of text in the same language spoken in the movie or program. Subtitles may include added information to help viewers who are deaf or hard of hearing to follow the dialog or commentary, or to help people who cannot understand the spoken dialogue or commentary, or who have accent recognition problems. The subtitles can either be pre-rendered with the video or separately provided as either graphics or text to be rendered and overlaid by a rendering device.

jj. "OCR" or "Optical Character Recognition"—The mechanical or electronic conversion of images of typed, handwritten or printed text into machine-encoded text, whether from a scanned document, a photo of a document, a scene-photo (for example the text on signs and billboards in a landscape photo) or from subtitles text superimposed on an image (for example from a television broadcast).

kk. "speech-to-text conversion"—A process by which spoken language is recognized and translated into machine-encoded text by computers. It is also known as "automatic speech recognition" (ASR), "computer speech recognition", or just "speech to text" (STT).

ll. "segment of text"—a chunk of text, that may be a single word, multiple words (whether comprising a known phrase or not), a sentence, multiple sentences, a paragraph, multiple paragraphs, a chapter, multiple chapters or a complete document. The term "segment of text" does not require or imply that the chunk of text corresponding to the segment is a subset of a larger chunk of text.

mm. "segment of video"—a portion of a video content item, including the case in which the portion is the full video content item.

nn. "a segment of video includes a given segment of text", "a segment of video includes a given word", "a segment of video includes a given occurrence of a reference to a named entity"—the spoken text appearing in the audio track of the segment of video includes the given segment of text, the given word, or the given occurrence.

oo. "playing a media content item"—outputting at least one of a video channel and an audio channel of the media content item to a visual output device (for example a TV screen) or an audio output device (for example a speaker or headphones). If the media content item is a still image, then playing it means outputting the still image to a visual output device. If the media content item is a video content item that has both a video channel and an audio channel, then playing it means outputting both the video channel and the audio channel to a visual output device and an audio output device, respectively.

Pausing a video content item in the middle of playing it is not considered playing the video content item. Also, showing the last frame of a video content item after it was played to its end is not considered playing the video content item.

pp. "displaying a media content item"—outputting a video channel of the media content item to a visual output device (for example a TV screen). If the media content item is a still image, then displaying it means outputting the still image to a visual output device. Pausing a video content item in the middle of playing it is considered displaying the video content item. Also, showing the last frame of a video content item after it was played to its end is considered displaying the video content item.

The invention claimed is:

1. A method for enriching a viewing experience of a user watching video content on a screen of a client terminal by increasing the relevance of additional media content proposed to the user, the method comprising:
   a. providing at least a portion of a video content item to the client terminal, thereby causing playing the at least a portion of the video content item on the screen of the client terminal;
   b. obtaining a segment of text that is spoken in a sound track of the video content item;
   c. identifying an occurrence of an ambiguous reference to a named entity in the segment of text, the ambiguous reference matching multiple candidate named entities;
   d. disambiguating the ambiguous reference, the disambiguating comprising:
      i. identifying the video content item;
      ii. identifying an information source, the information source being directly associated with the identified video content item; and
      iii. assigning one candidate named entity of the multiple candidate named entities to the ambiguous reference, the assigning being based on information from the identified information source;
   e. selecting one or more media content items that are related to the video content item, the selecting being based on the assigned one candidate named entity; and
   f. providing one media content item of the one or more media content items, thereby causing displaying the one media content item on the screen of the client terminal.

2. The method of claim 1, wherein
   i. the disambiguating additionally comprises analyzing visual content of a segment of video from the video content item, and
   ii. the assigning is also being based on a result of the analyzing.

3. The method of claim 1, wherein:
   i. the information from the identified information source comprises at least one of graphics and video,
   ii. the disambiguating additionally comprises analyzing visual content of the at least one of graphics and video, and
   iii. the information from the identified information source on which the assigning is based includes the analyzed visual content.

4. The method of claim 1, wherein the obtaining of the segment of text includes obtaining the segment of text from subtitles of the video content item.

5. The method of claim 1, wherein the obtaining of the segment of text includes converting speech appearing in the sound track of the video content item into text using a speech-to-text conversion engine.

6. The method of claim 1, wherein the disambiguating of the named entity is done in parallel to the playing of the at least a portion of the video content item.

7. The method of claim 1, wherein the information source directly associated with the identified video content item is a synopsis of the identified video content item.

8. The method of claim 1, wherein the information source directly associated with the identified video content item is an advertisement for the identified video content item.

9. The method of claim 1, wherein the information source directly associated with the identified video content item is a review of the identified video content item.

10. The method of claim 1, wherein the information source directly associated with the identified video content item is an entry in a source that is one of a group consisting of a database, a knowledge base, a dictionary and an encyclopedia, the entry corresponding to the identified video content item.

11. The method of claim 1, wherein the information source directly associated with the identified video content item is an account in a social network, the account being dedicated to the identified video content item.

12. A method for enriching a viewing experience of a user watching video content on a screen of a client terminal by increasing the relevance of additional media content proposed to the user, the method comprising:
  a. providing at least a portion of a video content item to the client terminal, thereby causing playing the at least a portion of the video content item on the screen of the client terminal;
  b. obtaining a segment of text that is spoken in a sound track of the video content item;
  c. identifying an occurrence of an ambiguous reference to a named entity in the segment of text, the ambiguous reference matching multiple candidate named entities;
  d. disambiguating the ambiguous reference, the disambiguating comprising:
    i. analyzing visual content of a segment of video from the video content item; and
    ii. assigning one candidate named entity of the multiple candidate named entities to the ambiguous reference to a named entity, the assigning being based on a result of the analyzing;
  e. selecting one or more media content items that are related to the video content item, the selecting being based on the assigned one candidate named entity; and
  f. providing one media content item of the one or more media content items, thereby causing displaying the one media content item on the screen of the client terminal.

13. The method of claim 12, wherein:
  i. the disambiguating additionally comprises:
    a. identifying the video content item; and
    b. identifying an information source, the information source being directly associated with the identified video content item, and
  ii. the assigning is also being based on information from the identified information source.

14. The method of claim 12, wherein the obtaining of the segment of text includes obtaining the segment of text from subtitles of the video content item.

15. The method of claim 12, wherein the obtaining of the segment of text includes converting speech appearing in the sound track of the video content item into text using a speech-to-text conversion engine.

16. The method of claim 12, wherein the segment of video does not include the identified occurrence of the ambiguous reference.

17. The method of claim 12, wherein at least a portion of the segment of text is not included in the segment of video.

18. The method of claim 12, wherein the disambiguating of the ambiguous reference is done in parallel to the playing of the at least a portion of the video content item.

19. A system for enriching a viewing experience of a user watching video content on a screen of a client terminal by increasing the relevance of additional media content proposed to the user, the system comprising:
  a. one or more computer processors;
  b. non-transitory computer-readable storage medium storing program instructions for execution by the one or more computer processors; and
  c. one or more media content servers in data communication with the client terminal and operable to (i) provide at least a portion of a video content item to the client terminal, so as to cause playing the at least a portion of the video content item on the screen of the client terminal, and (ii) provide a media content item, so as to cause displaying the media content item on the screen of the client terminal, wherein the media content item is one of one or more media content items selected by executing, by the one or more computer processors, the program instructions stored in the non-transitory computer-readable storage medium, wherein the stored program instructions comprise:
    i. first program instructions for identifying an occurrence of an ambiguous reference to a named entity in a segment of text that is spoken in a sound track of the video content item, the ambiguous reference matching multiple candidate named entities,
    ii. second program instructions for disambiguating the ambiguous reference, the disambiguating comprising (A) identifying the video content item, (B) identifying an information source that is directly associated with the identified video content item, and (C) assigning one candidate named entity of the multiple candidate named entities to the ambiguous reference, the assigning being done based on information obtained from the identified information source, and
    iii. third program instructions for selecting the one or more media content items, the one or more media content items being related to the video content item, the selecting being based on the assigned one candidate named entity.

20. A system for enriching a viewing experience of a user watching video content on a screen of a client terminal by increasing the relevance of additional media content proposed to the user, the system comprising:
  a. one or more computer processors;
  b. non-transitory computer-readable storage medium storing program instructions for execution by the one or more computer processors; and
  c. one or more media content servers in data communication with the client terminal and operable to (i) provide at least a portion of a video content item to the client terminal, so as to cause playing the at least a portion of the video content item on the screen of the client terminal, and (ii) provide a media content item, so as to cause displaying the media content item on the screen of the client terminal, wherein the media content item is one of one or more media content items selected by executing, by the one or more computer processors, the program instructions stored in the non-transitory computer-readable storage medium,
  wherein the stored program instructions comprise:
    i. first program instructions for identifying an occurrence of an ambiguous reference to a named entity in a segment of text that is spoken in a sound track of the video content item, the ambiguous reference matching multiple candidate named entities, ii. second program instructions for disambiguating the ambiguous reference, the disambiguating comprising (A) analyzing visual content of a segment of video from the video content item, and (B) assigning one candidate named entity of the multiple candidate named entities to the ambiguous reference to a named entity, the assigning being done based on a result of the analyzing, and iii. third program instructions for selecting the one or more media content items, the one or more media content items being related to the video content item, the selecting being based on the assigned one candidate named entity.

* * * * *